United States Patent
Black et al.

(10) Patent No.: US 10,543,911 B2
(45) Date of Patent: Jan. 28, 2020

(54) ROTARY WING AIRCRAFT VIBRATION CONTROL SYSTEM WITH RESONANT INERTIAL ACTUATORS

(71) Applicant: LORD Corporation, Cary, NC (US)

(72) Inventors: Paul Black, Fuquay-Varina, NC (US); Douglas Swanson, Cary, NC (US); Askari Badre-Alam, Cary, NC (US); David Edeal, Apex, NC (US); Douglas Pedersen, Apex, NC (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 15/872,690

(22) Filed: Jan. 16, 2018

(65) Prior Publication Data
US 2018/0346106 A1    Dec. 6, 2018

Related U.S. Application Data

(62) Division of application No. 13/983,463, filed as application No. PCT/US2012/023802 on Feb. 3, 2012, now abandoned.
(Continued)

(51) Int. Cl.
*B64C 27/00*    (2006.01)
*F16F 7/10*    (2006.01)
(Continued)

(52) U.S. Cl.
CPC .......... *B64C 27/001* (2013.01); *F16F 7/1011* (2013.01); *H02K 33/00* (2013.01); *H02P 25/032* (2016.02); *B64C 2027/004* (2013.01)

(58) Field of Classification Search
CPC .................................................. B64C 27/001
See application file for complete search history.

(56) References Cited

U.S. PATENT DOCUMENTS 2,439,219 A    4/1948    O'Connor
3,219,120 A    11/1965    Hooper
(Continued)

FOREIGN PATENT DOCUMENTS

DE    19741627    3/1993
DE    19823716    12/1999
(Continued)

OTHER PUBLICATIONS

Advanced Motion Controls, DigiFlex Performance Servo Drive, DZRALTE-020L080, Feb. 2, 2011, 8 pgs.
(Continued)

*Primary Examiner* — Imran K Mustafa

(57) ABSTRACT

A control system for resonant inertial actuators estimates operating parameters of the resonant inertial actuators based on voltage and current feedback and dynamically limits selected parameters to maintain the safe, efficient, and cost effective operation of the resonant inertial actuators. Resistance within the electrical drives for the resonant inertial actuators is estimated from the voltage and current feedback and in conjunction with the modeling of the resonant inertial actuators other operating parameters are calculated or otherwise estimated. Having regard for the responsiveness of the resonant inertial actuators to changes in command signals, the command signals are adjusted to dynamically limit the estimated parameters.

11 Claims, 38 Drawing Sheets

Related U.S. Application Data

(60) Provisional application No. 61/439,710, filed on Feb. 4, 2011.

(51) Int. Cl.
  H02K 33/00 (2006.01)
  H02P 25/032 (2016.01)

(56) References Cited

U.S. PATENT DOCUMENTS

| | | | |
|---|---|---|---|
| 3,509,971 | A | 5/1970 | Gerstine et al. |
| 3,635,427 | A | 1/1972 | Balke |
| 3,649,000 | A | 3/1972 | Desy |
| 3,649,132 | A | 3/1972 | Arcidiacono |
| 3,761,851 | A | 9/1973 | Nelson |
| 3,770,997 | A | 11/1973 | Presley |
| 3,782,854 | A | 1/1974 | Rybicki |
| 3,783,746 | A | 1/1974 | Jacobellis |
| 3,807,678 | A | 4/1974 | Karnopp et al. |
| 3,839,945 | A | 10/1974 | Jacobellis |
| 4,227,857 | A | 10/1980 | Reyes |
| 4,255,084 | A | 3/1981 | Mouille et al. |
| 4,426,911 | A | 1/1984 | Robinson et al. |
| 4,928,028 | A | 5/1990 | Leibovich |
| 5,005,439 | A | 4/1991 | Jensen |
| 5,219,143 | A | 6/1993 | Staple et al. |
| 5,347,884 | A | 9/1994 | Garnjoist |
| 5,492,313 | A | 2/1996 | Pan et al. |
| 5,620,068 | A | 4/1997 | Garnjost et al. |
| 5,647,726 | A | 7/1997 | Sehgal et al. |
| 5,757,662 | A | 5/1998 | Dyer et al. |
| 5,825,663 | A | 10/1998 | Barba |
| 5,896,076 | A | 4/1999 | Van Namen |
| 5,903,077 | A | 5/1999 | Garnjost et al. |
| 6,006,875 | A | 12/1999 | Van Namen |
| 6,105,685 | A | 8/2000 | Bald |
| 6,129,177 | A | 10/2000 | Gwinn |
| 6,212,445 | B1 | 4/2001 | Barba et al. |
| 6,236,934 | B1 | 5/2001 | Dyer et al. |
| 6,279,679 | B1 | 8/2001 | Thomasen |
| 6,286,782 | B1 | 9/2001 | Bansemir et al. |
| 6,318,527 | B1 | 11/2001 | Byrnes et al. |
| 6,354,536 | B1 | 3/2002 | Torok et al. |
| 6,416,016 | B1 | 7/2002 | Welsh |
| 6,476,534 | B1 | 11/2002 | Vanderbeck et al. |
| 6,480,609 | B1 | 11/2002 | Strehlow |
| 6,512,435 | B2 | 1/2003 | Van Namen |
| 6,618,646 | B1 | 9/2003 | Dyer |
| 6,639,496 | B1 | 10/2003 | Van Namen |
| 6,644,590 | B2 | 11/2003 | Terpay et al. |
| 6,769,872 | B2 | 8/2004 | Torok et al. |
| 7,288,861 | B1 | 10/2007 | Willard et al. |
| 7,370,829 | B2 | 5/2008 | Badre-Alam et al. |
| 7,449,803 | B2 | 11/2008 | Sanyoun |
| 7,550,880 | B1 | 6/2009 | Pusi |
| 7,686,246 | B2 | 3/2010 | Badre-Alam et al. |
| 7,692,345 | B2 | 4/2010 | Keyama et al. |
| 8,162,606 | B2 | 4/2012 | Jolly et al. |
| 8,267,652 | B2 | 9/2012 | Jolly et al. |
| 9,073,627 | B2 | 7/2015 | Jolly et al. |
| 9,776,712 | B2 | 10/2017 | Jolly et al. |
| 2002/0123403 | A1 | 9/2002 | Welsh |
| 2003/0060903 | A1* | 3/2003 | MacMartin ............ G05B 5/01 700/32 |
| 2003/0089193 | A1 | 5/2003 | Altieri et al. |
| 2003/0173725 | A1* | 9/2003 | Noe ...................... B64C 27/001 267/140.14 |
| 2004/0036367 | A1 | 2/2004 | Denton et al. |
| 2004/0050999 | A1 | 3/2004 | Hill et al. |
| 2004/0098168 | A1 | 5/2004 | Dyer |
| 2005/0079056 | A1 | 4/2005 | Welsh |
| 2005/0114053 | A1 | 5/2005 | Southward et al. |
| 2006/0054738 | A1* | 3/2006 | Badre-Alam ........ B64C 27/001 244/17.27 |
| 2009/0007560 | A1 | 1/2009 | Inoshiri |
| 2011/0155841 | A1 | 6/2011 | Cranga et al. |

FOREIGN PATENT DOCUMENTS

| | | |
|---|---|---|
| EP | 0409462 | 1/1991 |
| EP | 0601527 | 6/1994 |
| EP | 1659676 | 5/2006 |
| EP | 1780440 | 5/2007 |
| FR | 2825769 | 12/2002 |
| GB | 1120193 | 7/1968 |
| GB | 2344148 | 5/2000 |
| JP | 04136538 | 5/1992 |
| JP | 08233028 | 9/1996 |
| JP | 08247217 | 9/1996 |
| JP | 2001233296 | 8/2001 |
| JP | 2006046419 | 2/2006 |
| JP | 2006207749 | 8/2006 |
| WO | 2004003403 | 1/2004 |
| WO | 2010053933 | 5/2010 |

OTHER PUBLICATIONS

Advanced Motion Controls, B30A40 Series Brushless Servo Amplifiers, Camarilla, CA, pp. C-59-C-66.
The Composites Store, Inc., Carbon Rectangles and Strips, 2 pgs.
The Composites Store, Inc., Carbon Rectangles and Strips, Carbon Rectangles, 7 pgs.
GMI Composites, Inc., www.gmicomposites.com/composite_springs.php, 1 pg., Sep. 3, 2009.
graphitestore.com, Carbon Fiber Rod, Rectangular, Nov. 13, 2009, http://www.graphitestore.com/itemDetails.asp?search_string=carbon+fiber+rod%2C+rectangular&search_mode=1&item_id=1126&curPage=1, 3pgs.
Kollmorgen, BM(S) Motor Series, Data Publication, Radford, VA, pp. 1-17.
Konstanzer, Peter et al., A piezo inertial force generator optimized for high force and low frequency, Smart Mater. Struc. 16 (2007) 1260-1264.
MOOG Inc, HF General Characteristics—High Frequency Rotor/Stator Units, East Aurora, NY, 8 pgs.
Potter, J.L., Recent Advancement in Elastomeric Products for Improving Helicopter Reliability and Maintainability, Lord Corporation, 1979, 24 pgs.
supermagnetman.net, Rectangle Magnet, Mar. 14, 2011, http://www.supermagnetman.net/product_info.php?cPath=39&products_id=373, 3 pgs.

* cited by examiner

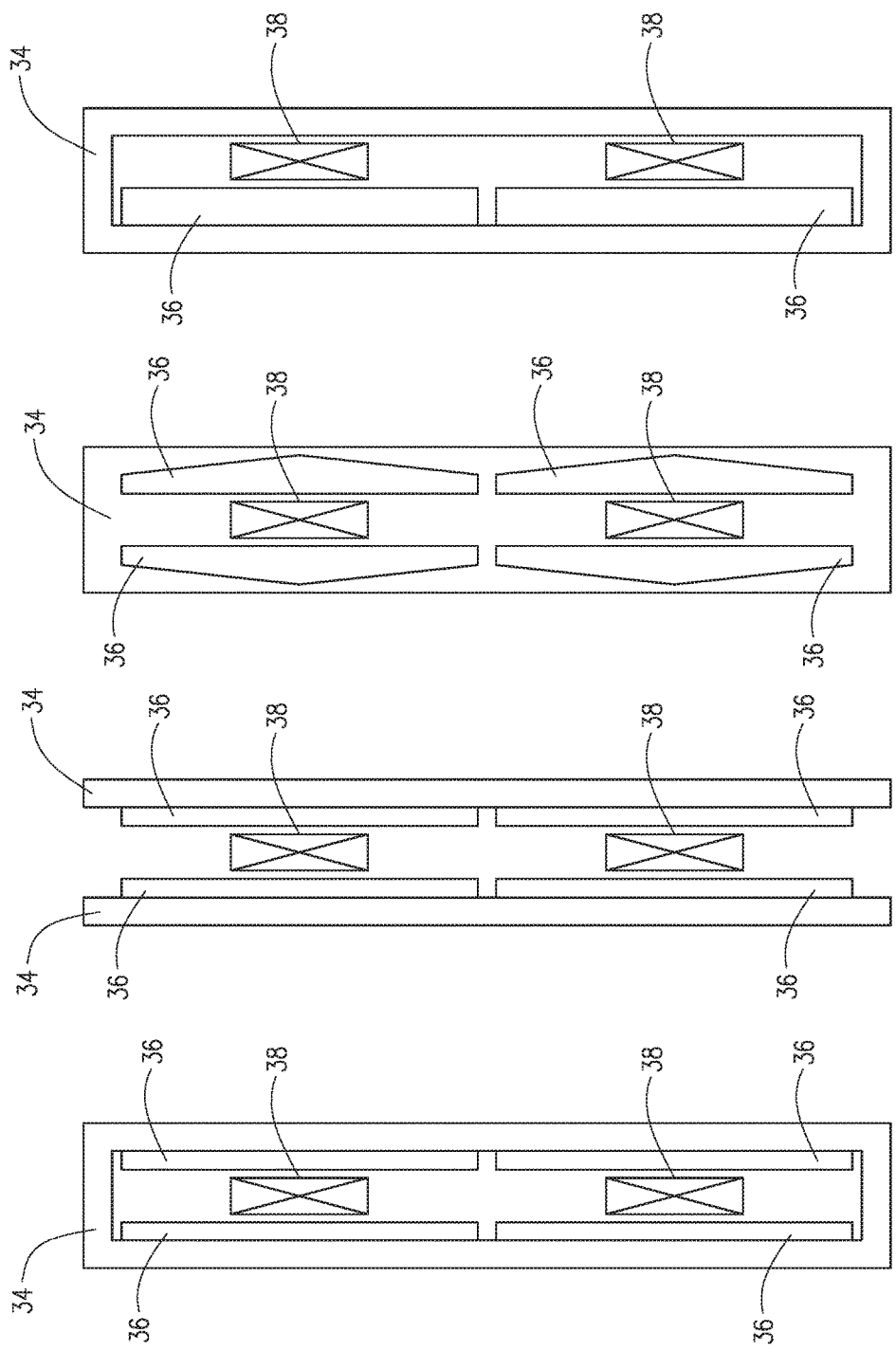

X: 0.01825
Y: -6.924

ROTARY WING AIRCRAFT VIBRATION CONTROL SYSTEM WITH RESONANT INERTIAL ACTUATORS

This patent application claims the benefit of and is a divisional application of U.S. application Ser. No. 13/983,463, filed Aug. 2, 2013, which claims the benefit of, and incorporates by reference, international application PCT/US2012/023802 filed on Feb. 3, 2012 and U.S. Provisional Application No. 61/439,710 filed on Feb. 4, 2011, all of which are incorporated herein by reference in their entireties.

TECHNICAL FIELD

The invention relates to aircraft vibration control systems and linear motor controls and in particular to electronic controls for resonant inertial actuators of vibration-cancelling force generators for such purposes of regulating electrical and mechanical outputs.

BACKGROUND

Resonant inertial actuators of vibration-cancelling force generators, such as those used for at least partially cancelling unwanted rotary wing aircraft vibrations, include electronic control systems that regulate electrical drive currents for driving the resonant inertial actuators about a natural resonant frequency. The rotary wing aircraft vibration cancelling electronic control systems include a command input for receiving a command signal and a power amplifier for providing the electrical drive current to the resonant inertial actuator. A feedback system from the resonant inertial actuator to the electronic control system adjusts the electrical drive current based on outputs of the resonant inertial actuator.

The vibration-cancelling force generators are attached to the aircraft machine structure that is subject to the unwanted vibrations. Resonant inertial actuators have a frame for attachment to the machine structure and an electromagnetically driven sprung mass supported by the frame. The sprung mass, which includes an inertial mass connected to the base frame through a resilient coupling, such as flexure plates, is electromagnetically driven by modulating an oriented electromagnetic field so that the sprung mass is oscillated at the natural resonance frequency. The resonance frequency of the sprung mass corresponds to the frequency at which the machine structure is subject to unwanted vibration, and the phase of the sprung mass oscillation is offset with respect to the phase of the unwanted vibration to produce destructive interference.

The command signal can be a variable analog input voltage received by the command input as an instruction to provide a scaled electrical drive current to the resonant inertial actuator. The feedback system, which also connects the resonant inertial actuator to the electronic control system, can monitor both a feedback current through the resonant inertial actuator and a feedback voltage across the inertial actuator. Based on the two feedbacks, the electronic control system can limit the inertial actuator current and voltage to respective maximum values.

When driving the resonant inertial actuator with drive current, significant changes in the force response of the inertial actuator are known to accompany frequency sweeps through the frequency of the inertial actuator's natural resonance. On the other hand, voltage control is known to have a much flatter response in both magnitude and phase through the natural resonance frequency. Near resonance, a weak current loop has been used, which has some voltage-like performance near resonance.

Known resonant inertial actuators have strict design limits for such parameters as voltage, current, force, stroke, power, and temperature. To assure safe and efficient operation within these design limits, resonant inertial actuators are generally designed with considerable "overhead" in their mechanical and electrical design. The overhead, which involves additional design features or scaling to larger sizes or capacities, generally result in heavier and more expensive inertial actuators and actuator controls.

SUMMARY OF THE INVENTION

In embodiments the invention includes management and limiting of vibration within vibrating machine structures of rotary wing aircraft machines, and includes among its preferred embodiments methods for dynamically limiting one or more operating parameters of rotary wing aircraft vibration control system resonant inertial actuators operating within the vibrating structures for maintaining safe, efficient, and cost effective operation of the resonant inertial actuators. In addition, responsiveness of the resonant inertial actuators to command signals is addressed or otherwise accommodated for achieving the desired control over the operation of the resonant inertial actuators. Resonant inertial actuator parameters such as voltage, current, power, stroke, force, and temperature are monitored and dynamically limited. By maintaining operation of the resonant inertial actuators within design limits, such as set by these parameters, the inertial actuators can be sized and otherwise designed more closely to the design limits and can be operated with improved efficiency and reliability.

Resistance within the electrical drives for the resonant inertial actuators can be estimated from voltage and current feedback from the resonant inertial actuators, and in conjunction with modeling of the resonant inertial actuators, other operating parameters can be calculated or otherwise estimated. Responsiveness of the resonant inertial actuators to changes in command signals can be optimized both for achieving the desired output of the inertial actuators and for dynamically limiting the monitored parameters of the inertial actuators.

Voltage control with current limiting can be used to improve the flatness of the force response. A dead zone current loop can be used to generate error values associated with sensed current values beyond a determined limit. A command signal to the inertial actuator can be progressively reduced in response to the accumulation of the error values. Additional filtering can also be used to further improve the flatness of the response.

Digital signal processing (DSP) provides for shape filtering, online estimating of resistance and temperature, and calculating displacement and force. Quadrature amplitude demodulation can be used to measure the magnitudes of voltage, current, displacement, temperature, force, and power of the inertial actuators.

In embodiments the invention features a method of limiting vibration in a rotary wing aircraft having a vibrating structure and a vibration control system for dynamically limiting an operating parameter of a resonant inertial actuator operating within the vibrating structure. The resonant inertial actuator is driven at a near resonant frequency of the resonant inertial actuator for counteracting vibrations in the vibrating structure of the rotary wing aircraft. In addition, the resonant inertial actuator is intermittently driven at an off-resonance frequency for separate intervals of time. Performance of an electric circuit for powering the resonant inertial actuator is monitored over at least portions of the separate intervals of time. Values of the operating parameter of the resonant inertial actuator are calculated based on the monitored performance of the electric circuit within the separate time intervals. A demanded force of the resonant inertial actuator is reduced in response to calculated values of the resonant inertial actuator operating parameter crossing a threshold value.

For example, resistance values of the electric circuit can be estimated from the monitored performance and these resistance values can be incorporated into the calculation of the values of the resonant inertial actuator operating parameter. The operating parameter can be actuator displacement and the demanded force can be reduced in response to calculated values of the actuator displacement crossing the resonant inertial actuator threshold value. Values of a second operating parameter in the form of an actuator force parameter can be calculated from the values of the displacement parameter. The demanded force of the resonant inertial actuator can be reduced in response to calculated values of the force parameter crossing a resonant inertial actuator threshold value. Other resonant inertial actuator operating parameters that can be monitored include the temperature of the inertial actuator, which can be limited by the reduction in the demanded force, and actuator power, which can be used as another threshold value for reducing the demanded force.

In embodiments the invention features a method of operating a vibration control system of a rotary wing aircraft for counteracting vibrations in a vibrating structure of the aircraft. Current and voltage through a resonant inertial actuator are monitored over at least a portion of an interval of time. Vibration frequency of the vibrating structure of the rotary wing aircraft is also monitored. The monitored current and voltage in a time domain is transformed in reference to the vibration frequency in quadrature into complex current and voltage values in a frequency domain over at least a portion of the time interval. The complex values for current and voltage are incorporated into a calculation of a value of an operating parameter of the resonant inertial actuator. The calculated value of the operating parameter is compared to a threshold relating to a desired range of operation for the resonant inertial actuator. The command output of the resonant inertial actuator is limited to maintain the value of the operating parameter within the desired range.

In embodiments the resonant inertial actuator operating parameter is preferably at least one of actuator temperature, actuator displacement, actuator force, and actuator power and has a calculated value based at least in part on the averaged complex values for current and voltage.

In embodiments the interval of time can be one of a plurality of separate time intervals. The resonant inertial actuator can be intermittently driven at an off-resonance frequency that departs from the monitored frequency for the separate time intervals. The complex values for current and voltage can be incorporated into a calculation which includes estimating resistance values through the resonant inertial actuator as a real part of impedance. The estimated resistance values can be incorporated in turn into the calculation of the operating parameter. The command output can be limited by limiting at least one of current and voltage for driving the inertial actuator.

In an embodiment the invention includes a machine, the machine includes a resonant inertial actuator controller and a resonant inertial actuator, the resonant inertial actuator has a resonant frequency, the resonant inertial actuator controller electromagnetically drives the resonant inertial actuator at a near resonant frequency, with the near resonant frequency proximate the resonant frequency, the resonant inertial actuator controller intermittently drives the resonant inertial actuator at an off-resonance frequency for separate intervals of time, with the off-resonance frequency distal from the resonant frequency, with the resonant inertial actuator controller monitoring a current and a voltage through the resonant inertial actuator over at least portions of the separate intervals of time, and with the controller calculating an operating parameter value of the resonant inertial actuator based on the monitored current and the monitored voltage within the separate time intervals wherein the controller reduces the demanded force of the resonant inertial actuator in response to the calculated operating parameter value crossing a threshold value.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWING FIGURES

Figure 15A:
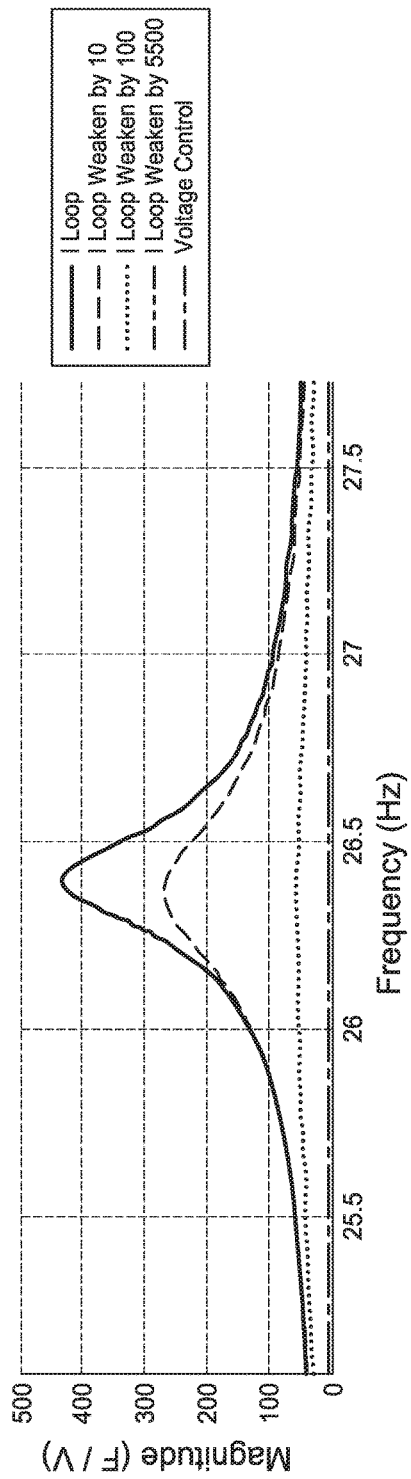
Figure 15B:
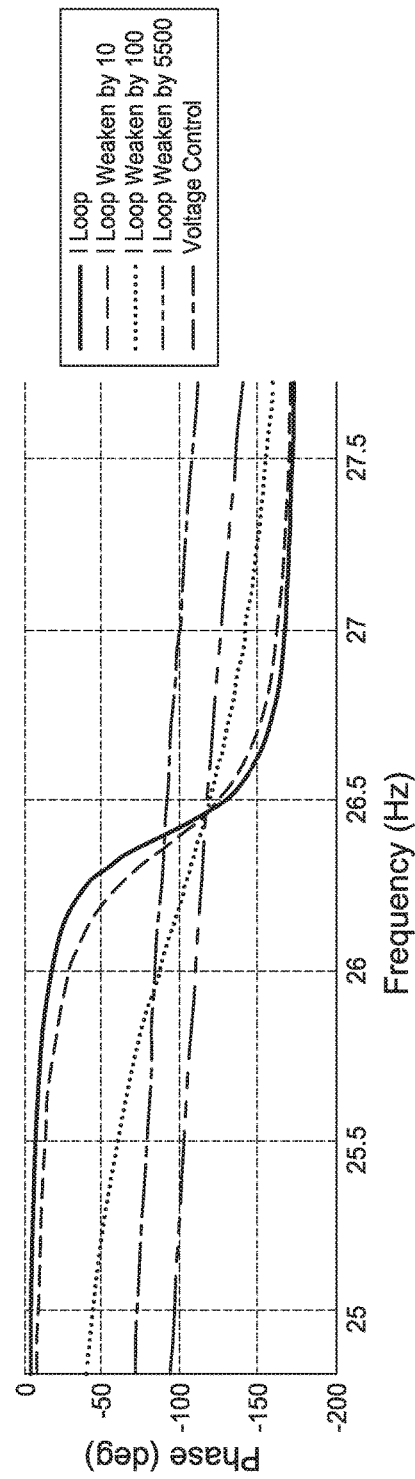

FIGS. 15a and 15b contain plots comparing current control to voltage control in measures of magnitude and phase over a common frequency domain.

Figure 16:
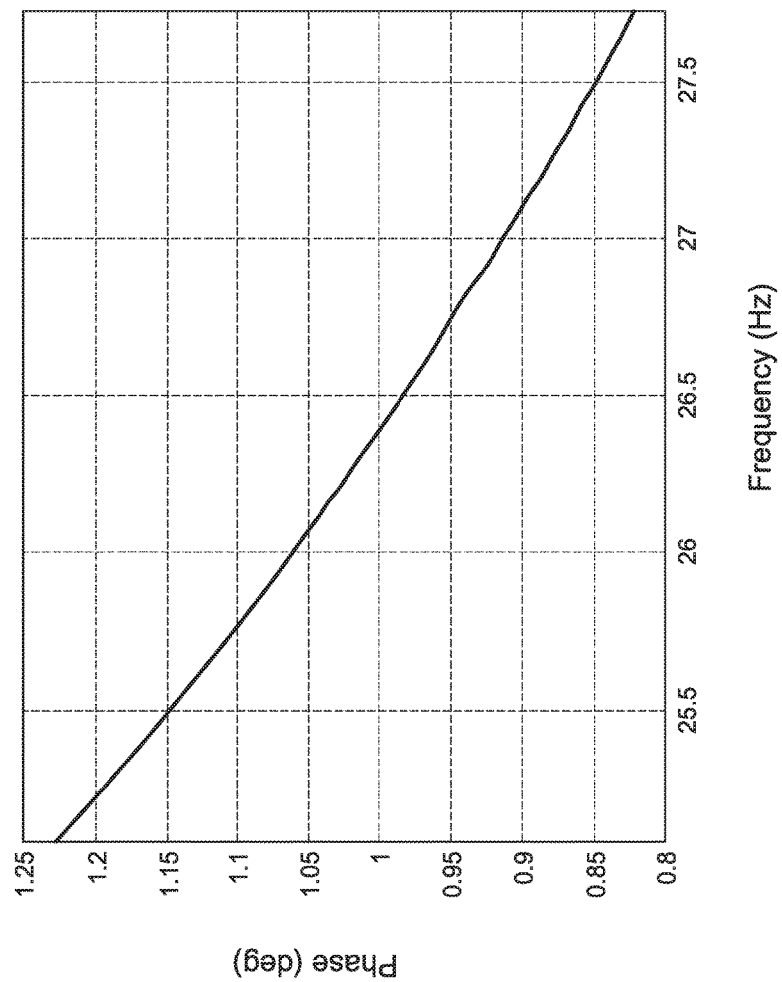

FIG. 16 contains a plot of a reference gain function intended for improving the flatness of a force response in voltage control.

Figure 17A:
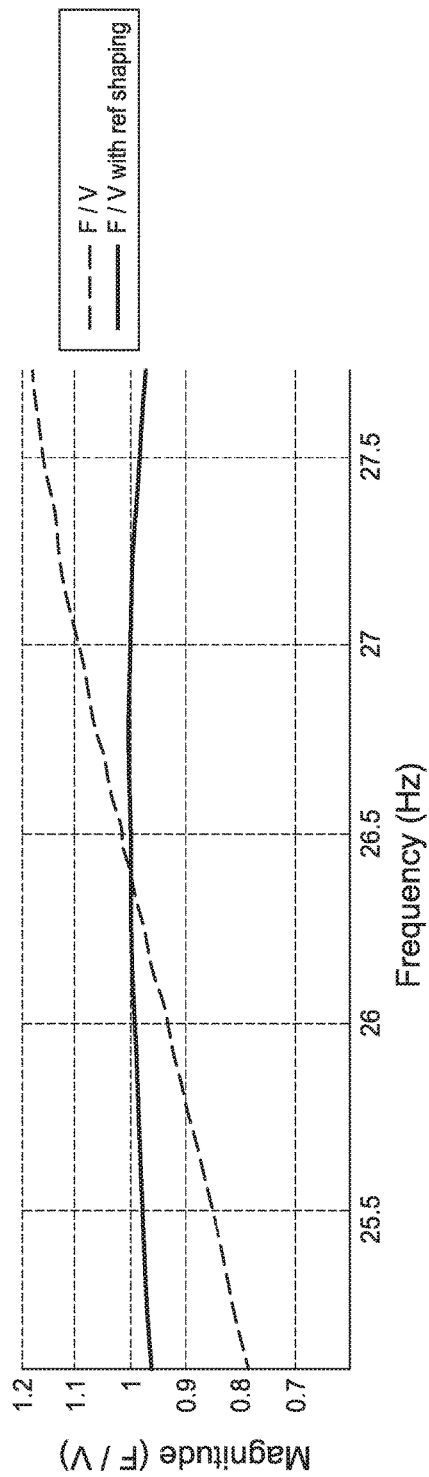
Figure 17B:
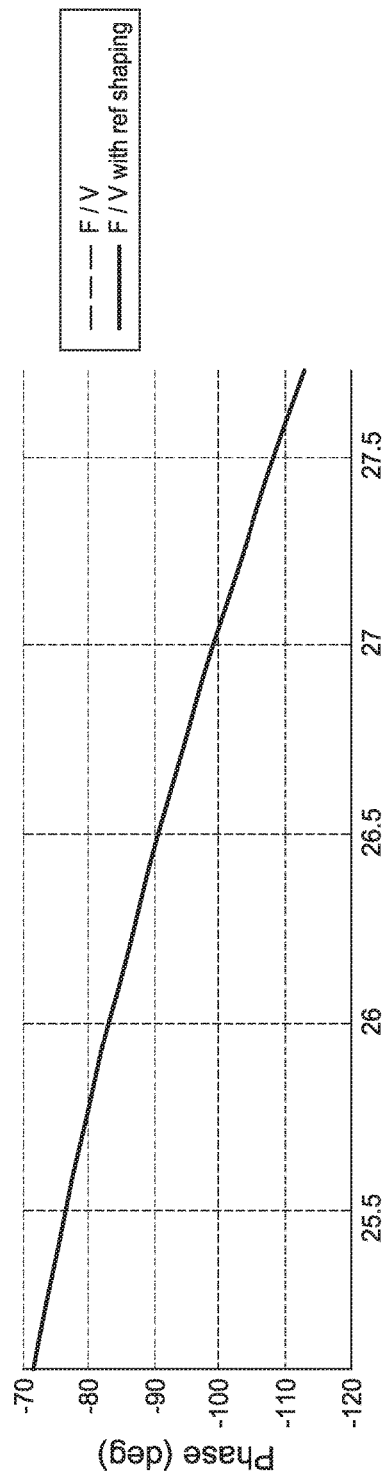

FIGS. 17a and 17b contain plots comparing voltage control with and without reference gain shaping.

Figure 18A:
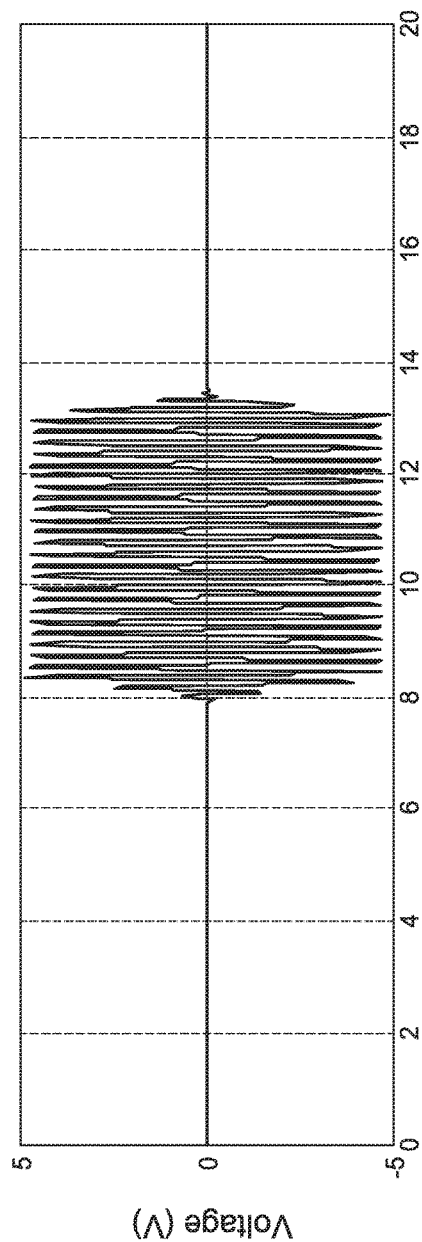
Figure 18B:
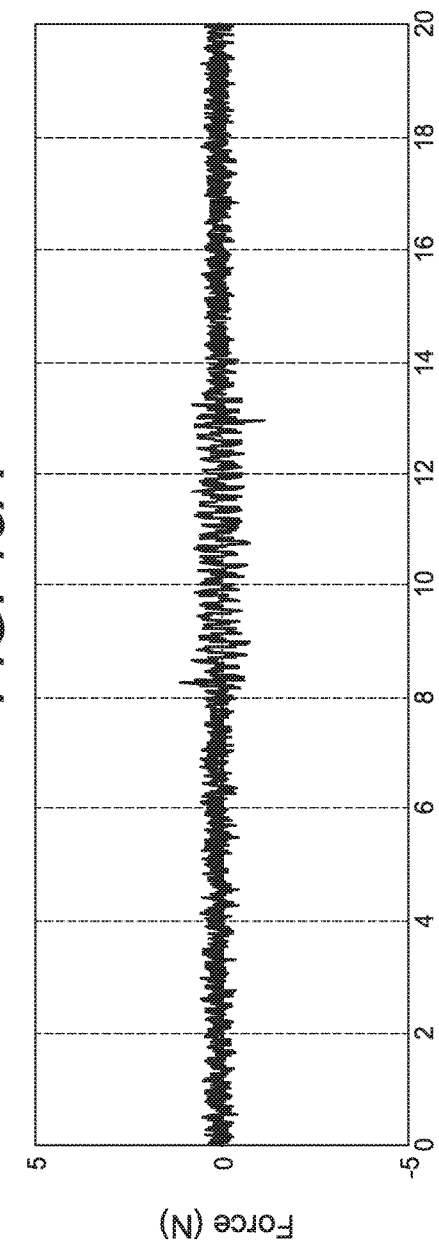

FIGS. 18*a* and 18*b* contain plots of a voltage signal and accompanying actuator force associated with a non-resonant oscillation of the actuator for purposes of assessing resistance.

Figure 19:
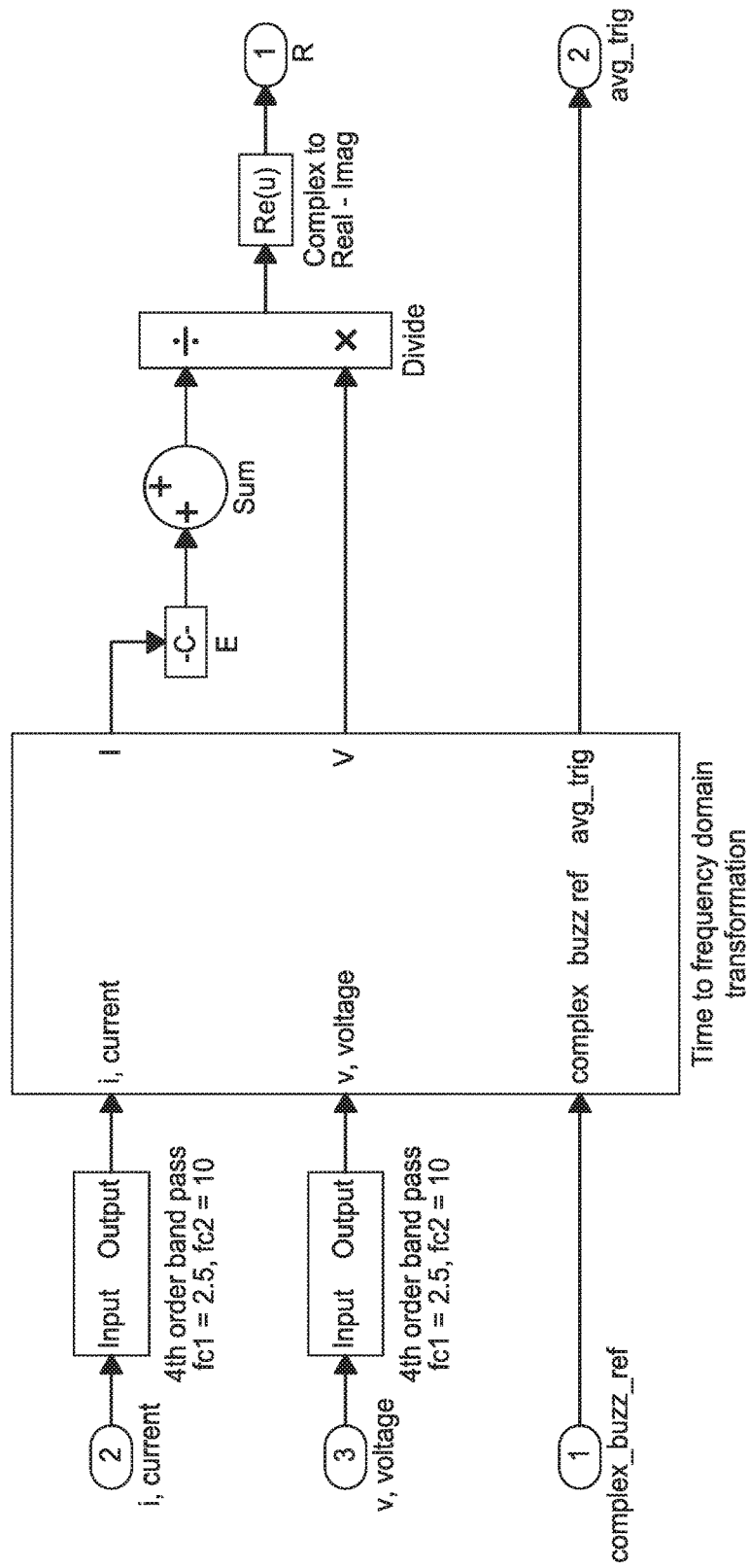

FIG. 19 is a schematic model for estimating resistance in the actuator from the feedback current and voltage.

Figure 20:
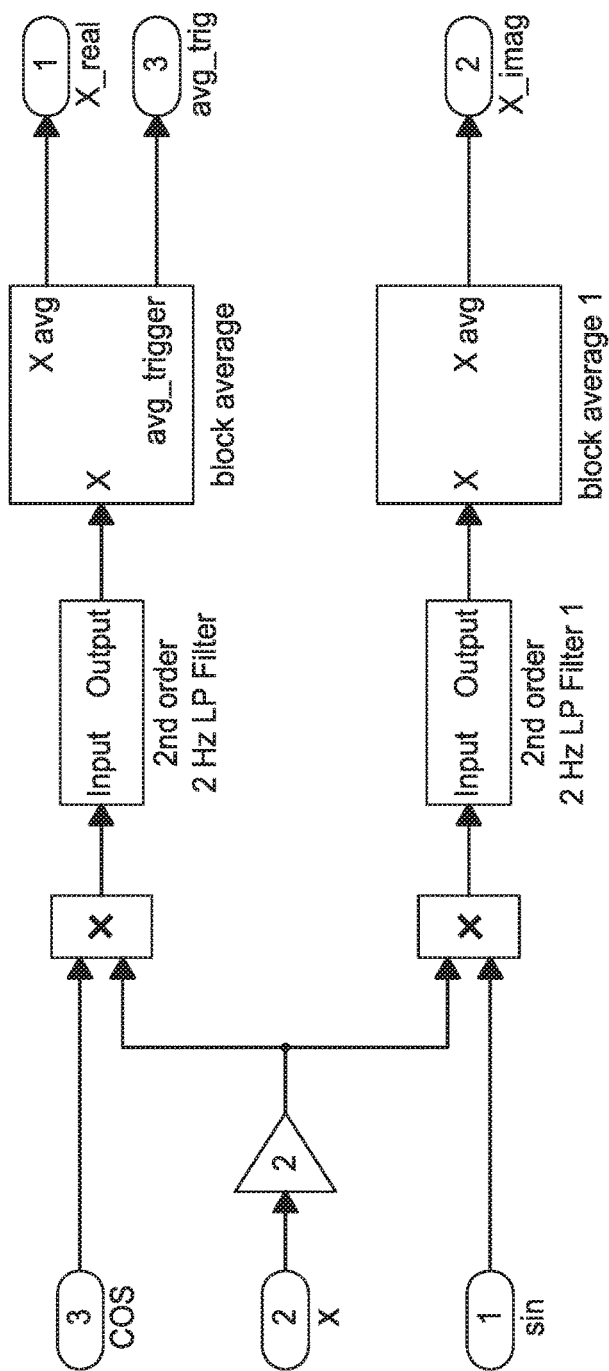

FIG. 20 is a schematic model for performing quadrature amplitude demodulation and block averaging.

Figure 21:
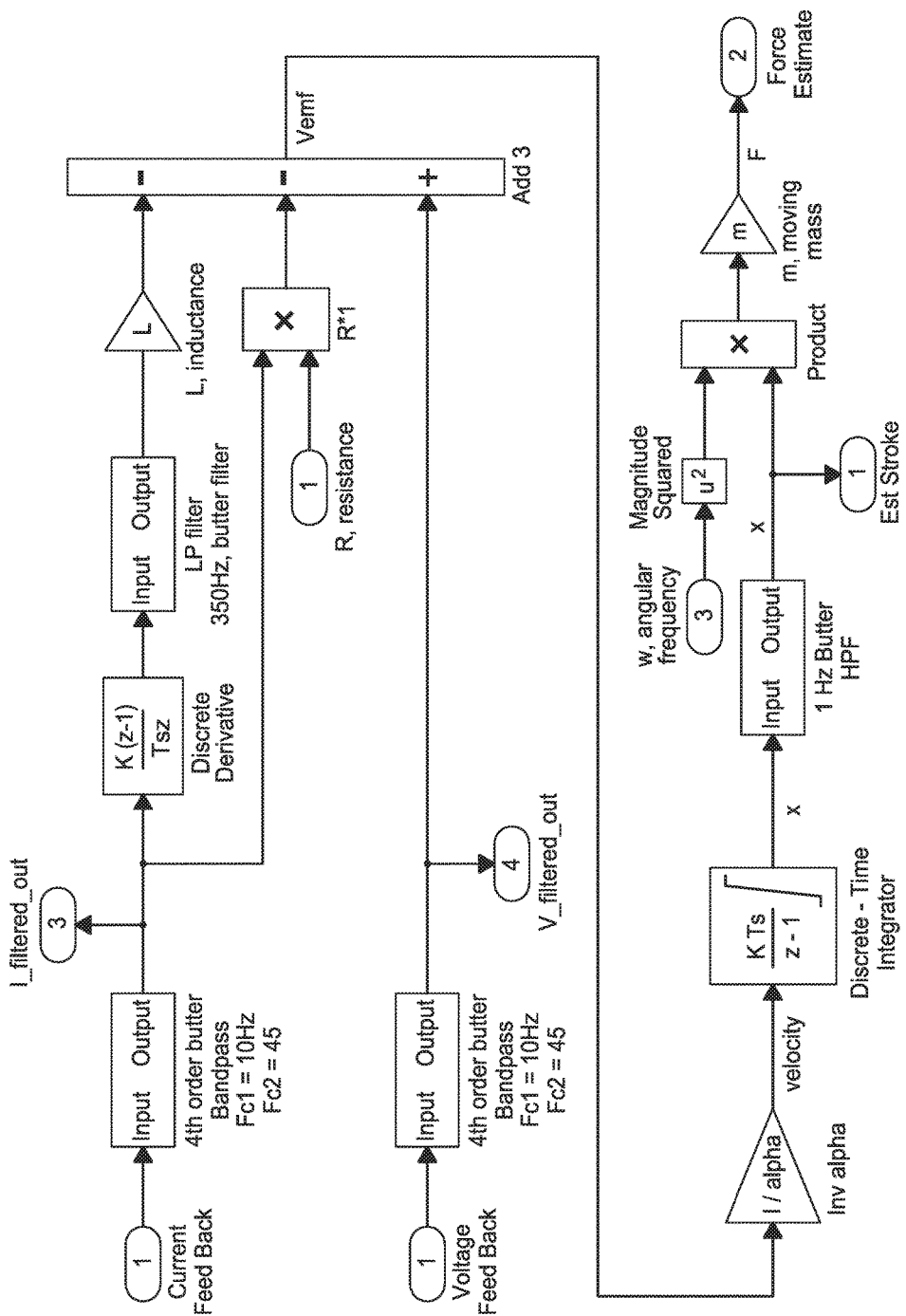

FIG. 21 is a schematic model for estimating displacement and force based on the estimate for resistance.

Figure 22:
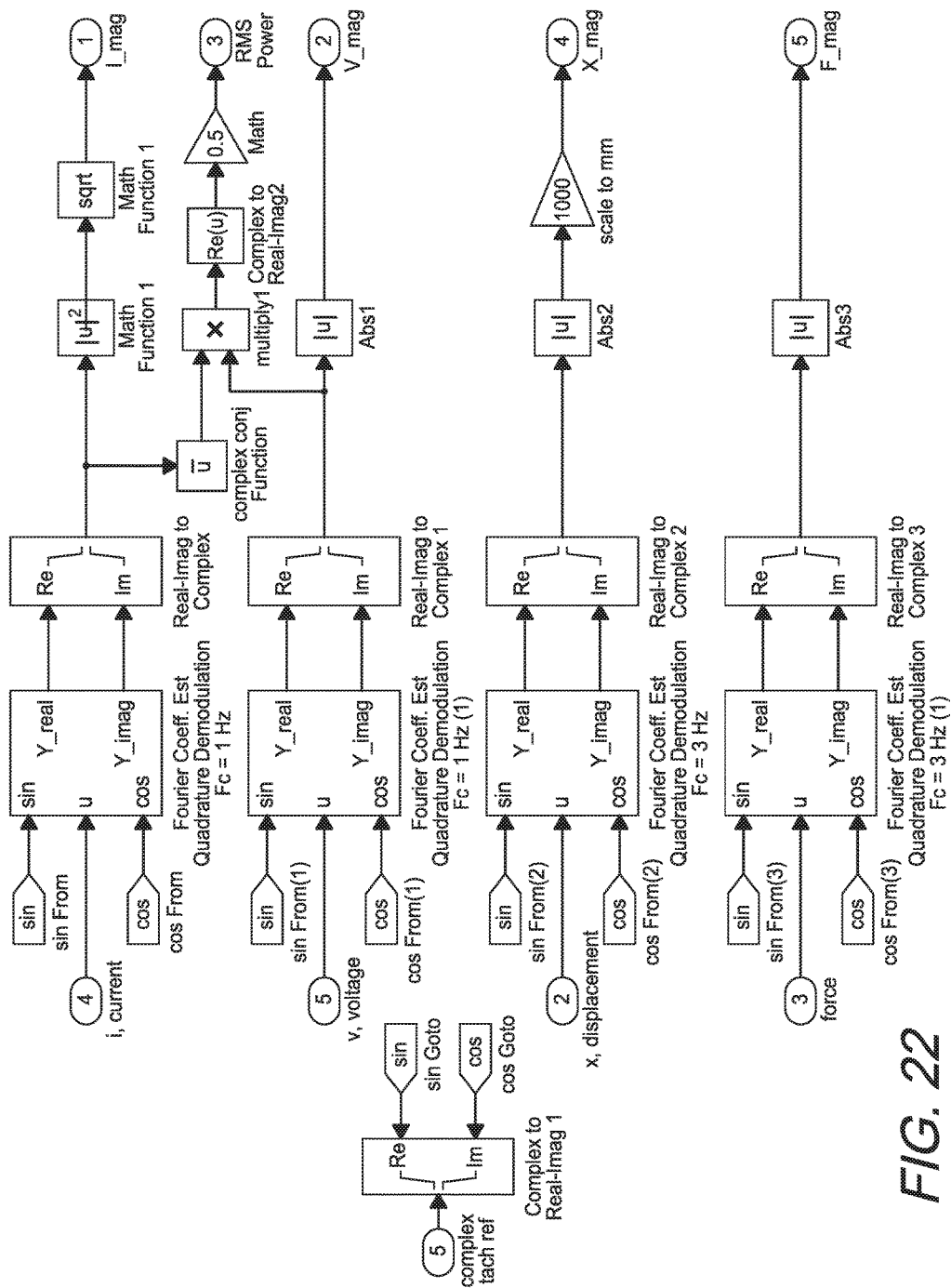

FIG. 22 is a schematic model for performing quadrature amplitude demodulation to estimate current, voltage displacement, and force, along with a RMS power calculation.

Figure 23A:
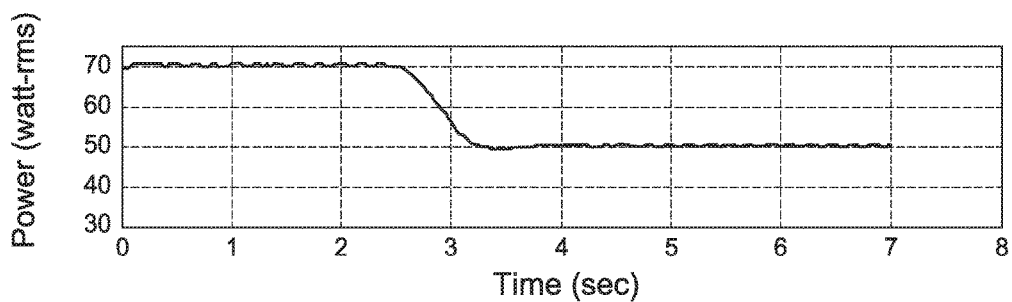
Figure 23B:
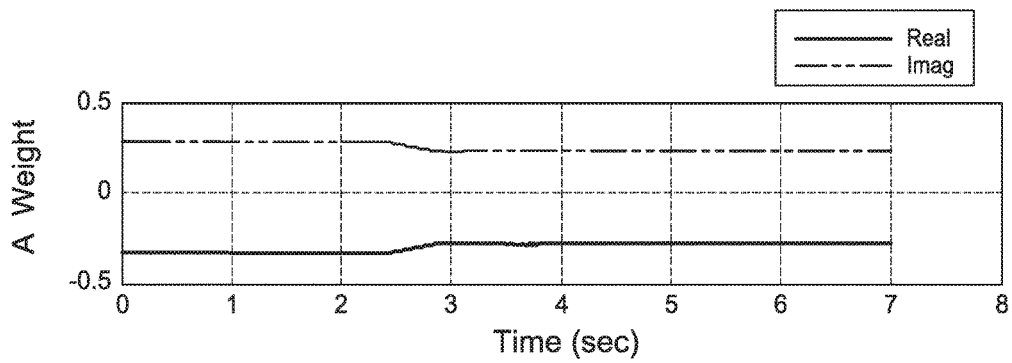
Figure 23C:
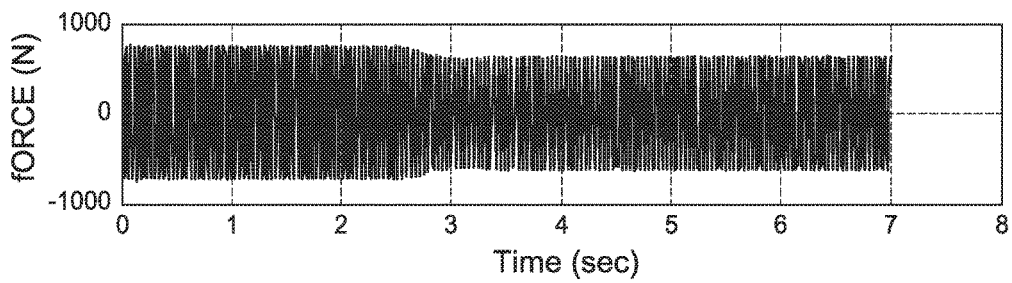

FIGS. 23*a*-23*c* contain plots of power, A weight, and force showing the effects of dynamic power limiting over a common time interval.

Figures 24, 25:
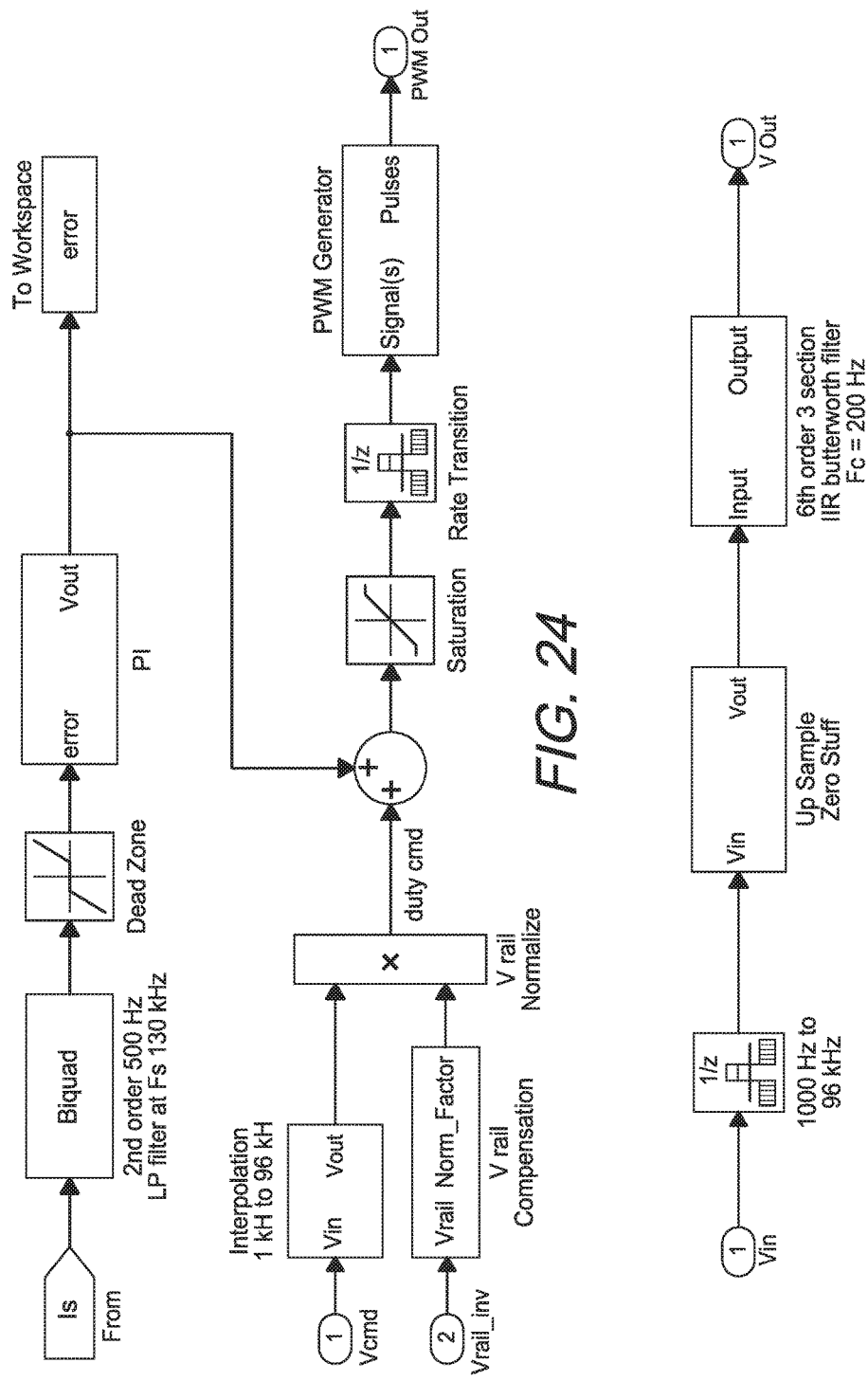

FIG. 24 is a schematic model of FPGA motor control architecture.

FIG. 25 is a schematic model of an interpolation filter within the motor control architecture.

Figure 26A:
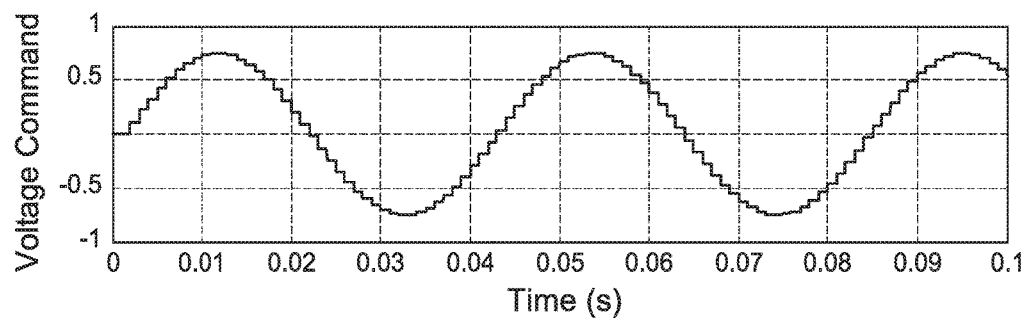
Figure 26B:
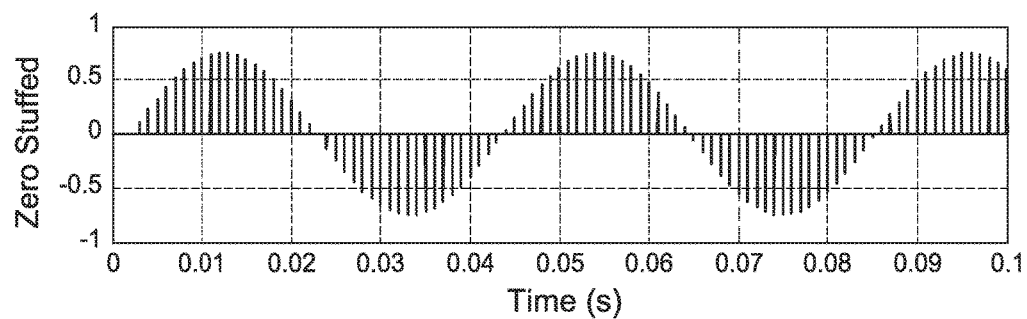
Figure 26C:
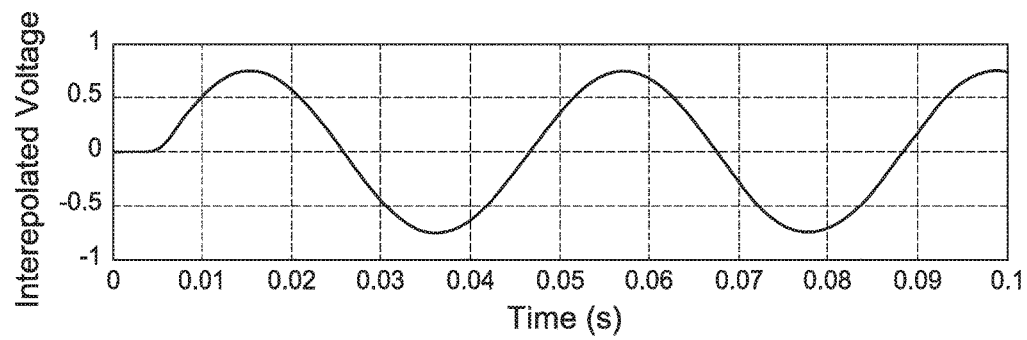

FIGS. 26*a*-26*c* contain plots showing the effects of the interpolation filter based on a voltage command with zero stuffed sampling, and an interpolated voltage over a common time interval.

Figure 27A:
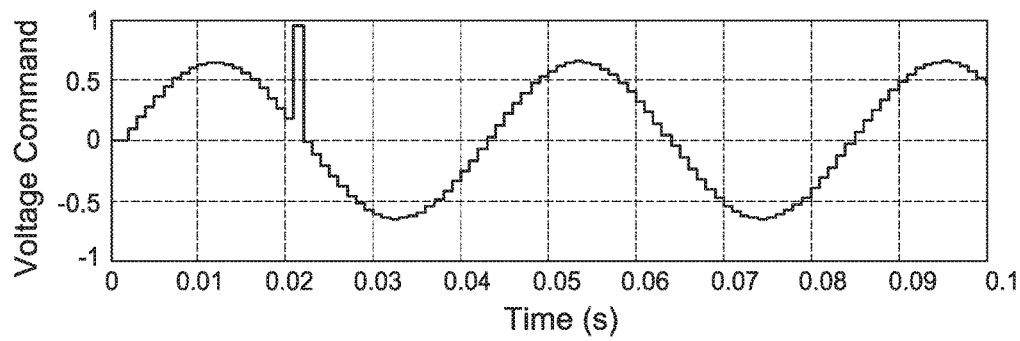
Figure 27B:
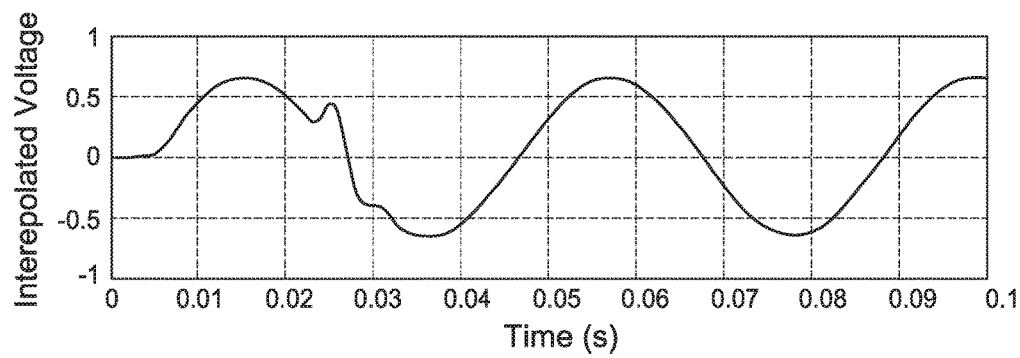
Figure 27C:
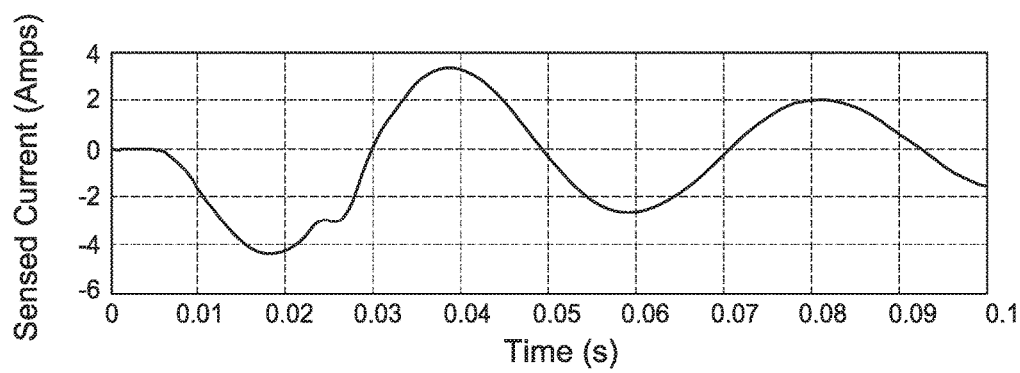

FIGS. 27*a*-27*c* contain plots showing the effects of the interpolation filter based on a voltage command subject to a significant impulse in terms of an interpolated voltage and a sensed current.

Figure 28:
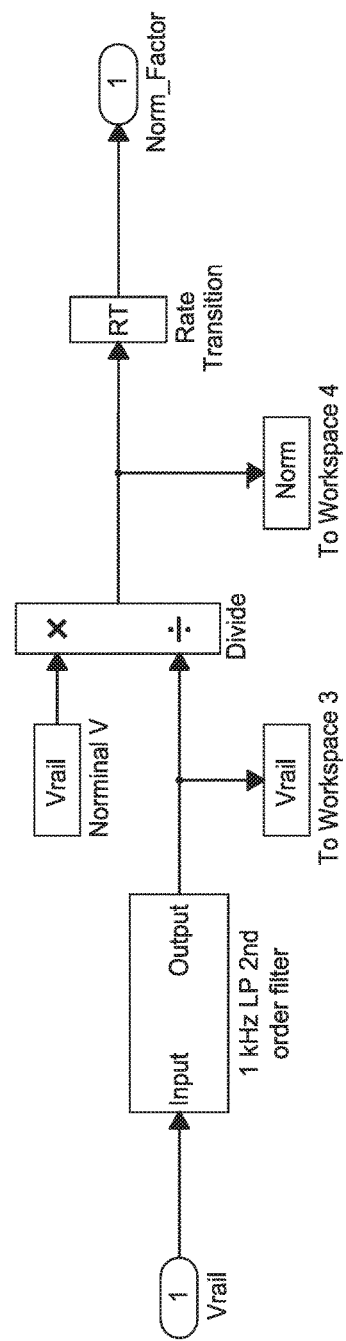

FIG. 28 is a schematic model of voltage rail compensator.

Figure 29:
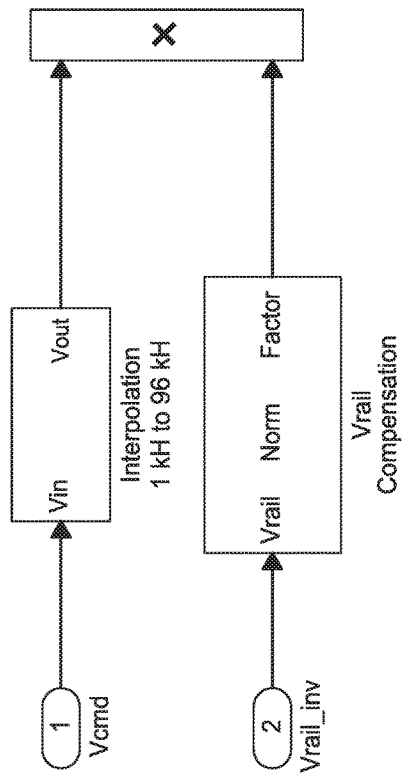

FIG. 29 models a normalization factor for the compensator.

Figure 30A:
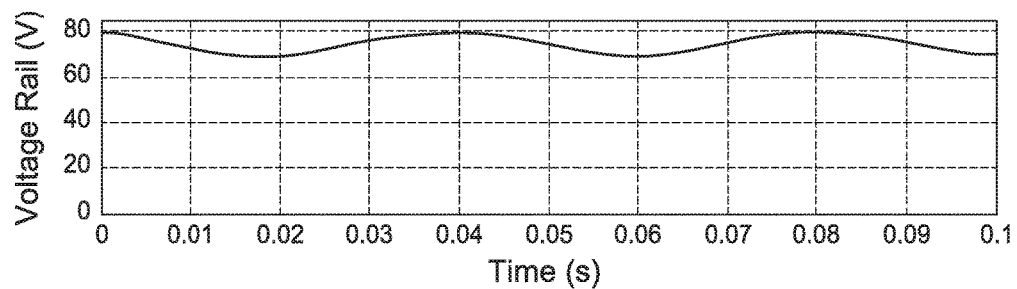
Figure 30B:
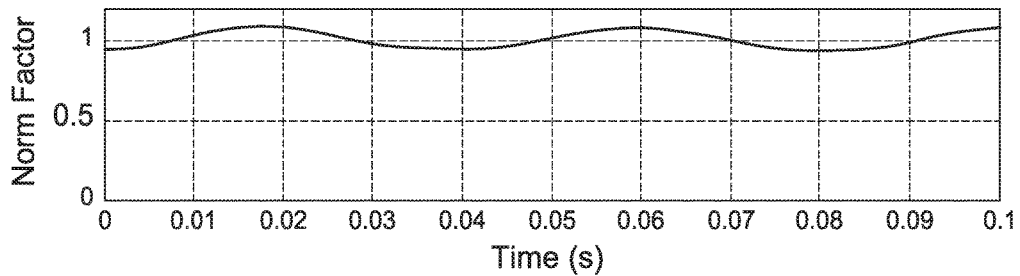
Figure 30C:
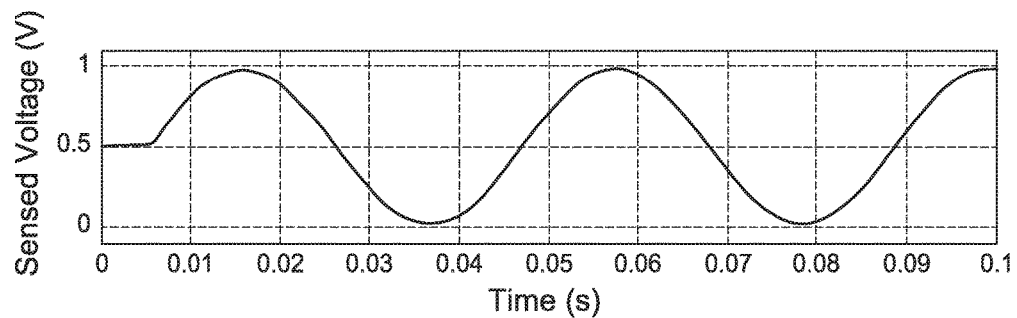

FIGS. 30*a*-30*c* contain plots simulating results of voltage rail compensation in terms of the voltage of the voltage rail, a normalization factor, and a sensed voltage over a common time interval.

Figure 31A:
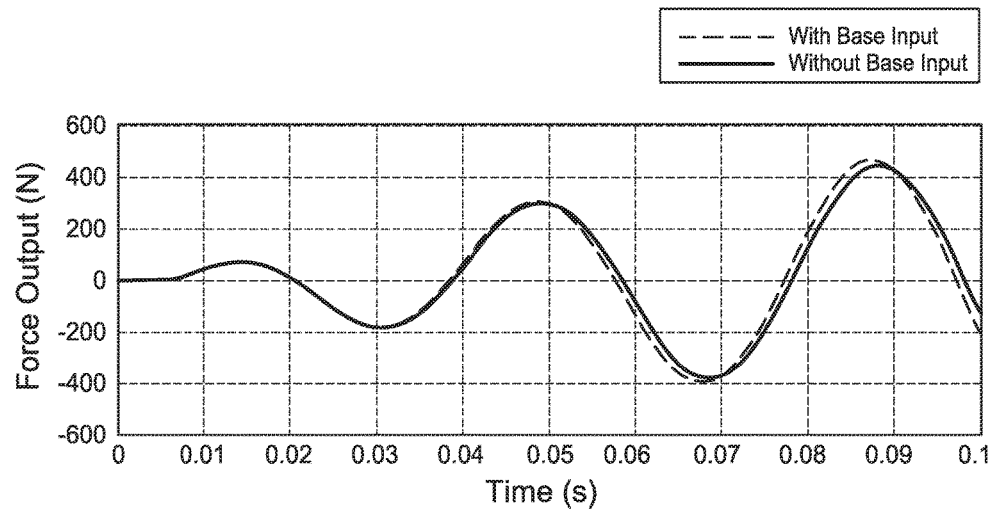
Figure 31B:
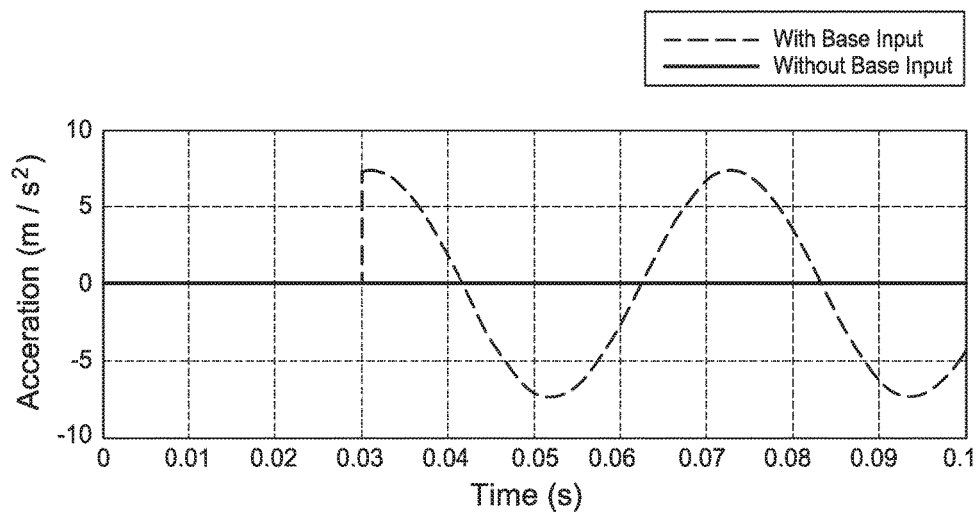

FIGS. 31*a* and 31*b* contain plots showing the limited effect of the disturbance on the force output of the actuator accompanying voltage rail compensation.

Figure 32:
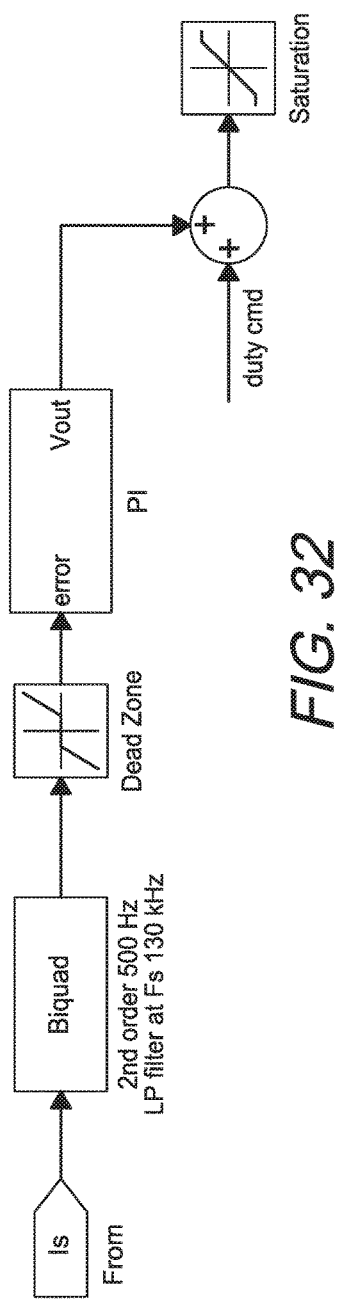

FIG. 32 is schematic model of a dead zone current loop.

Figure 33:
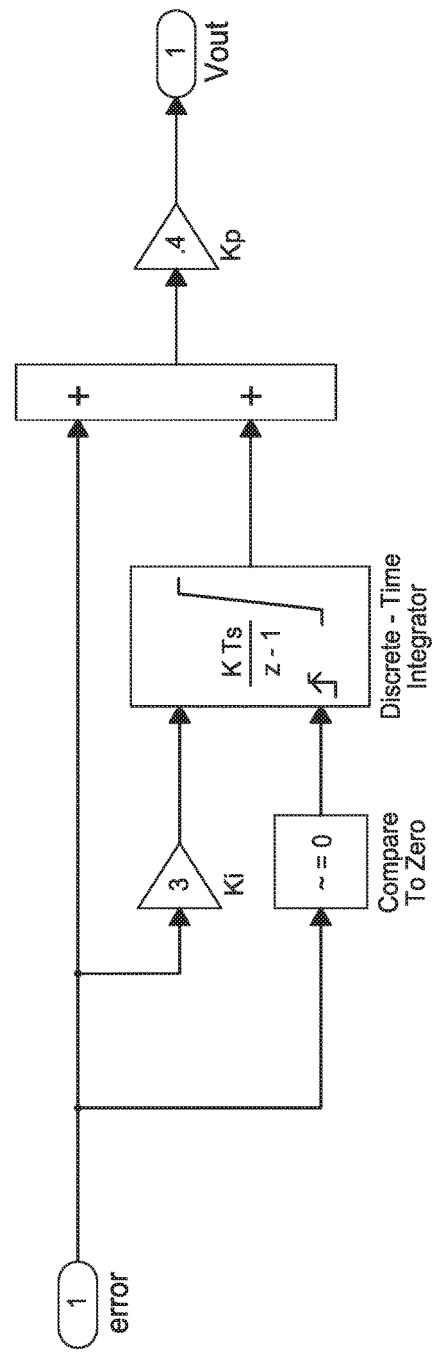

FIG. 33 is a schematic model of a PI compensator for use with the dead zone current loop.

Figure 34A:
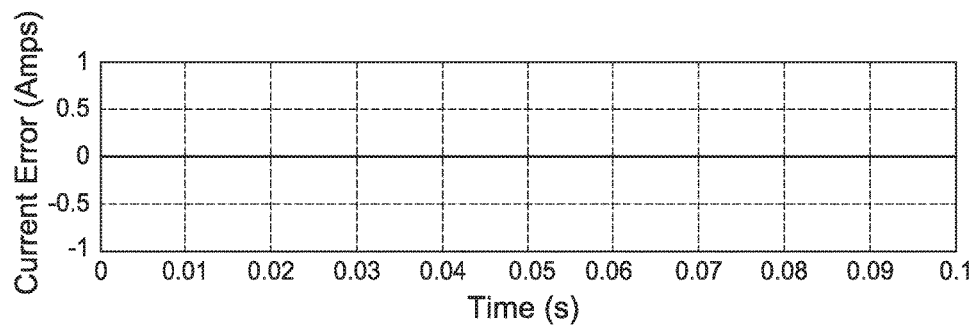
Figure 34B:
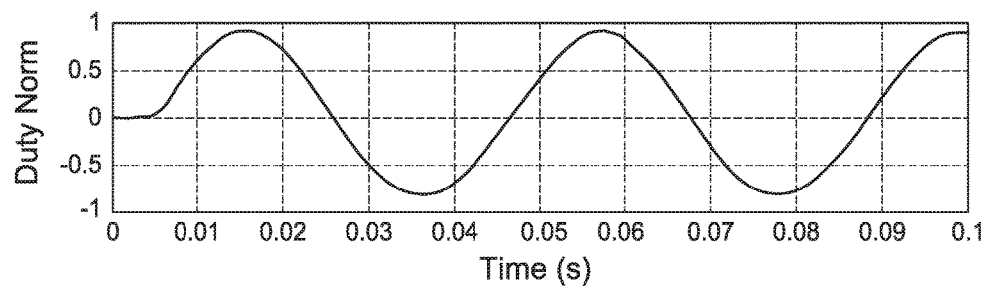
Figure 34C:
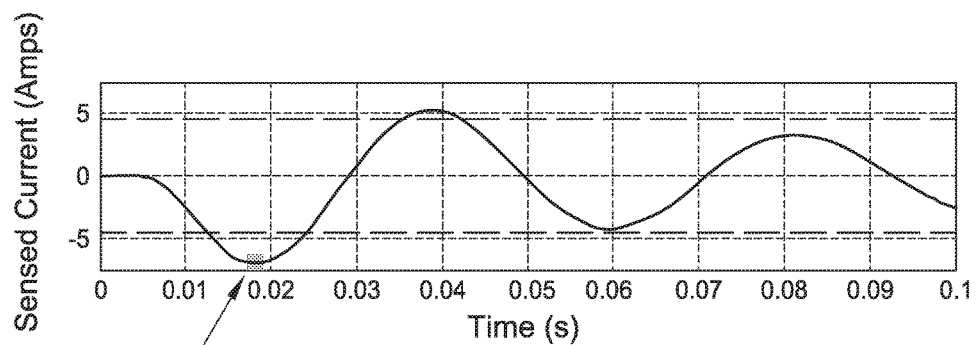

FIGS. 34*a*-34*c* contain plots corresponding to a potential over-current condition with the dead zone current loop disabled as reflected by a negligible current error and an unmodified normalized duty command but with a sensed current exceeding a current limit.

Figure 35A:
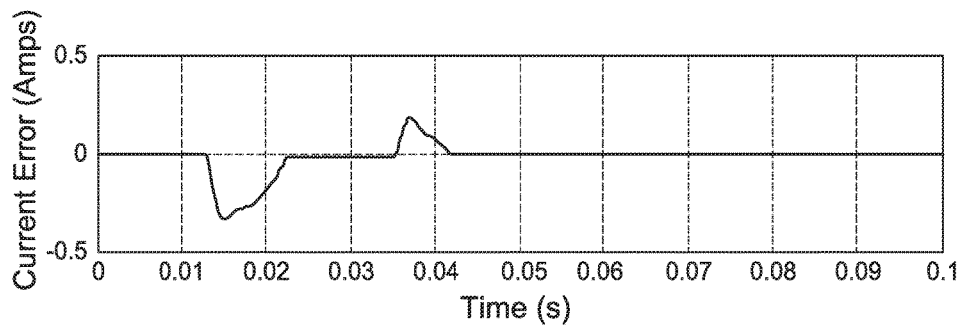
Figure 35B:
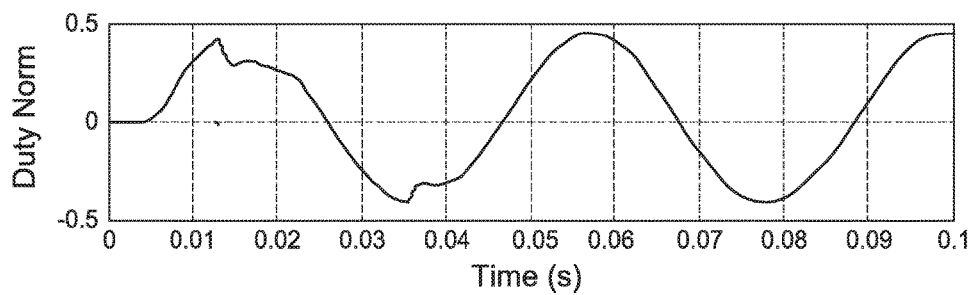
Figure 35C:
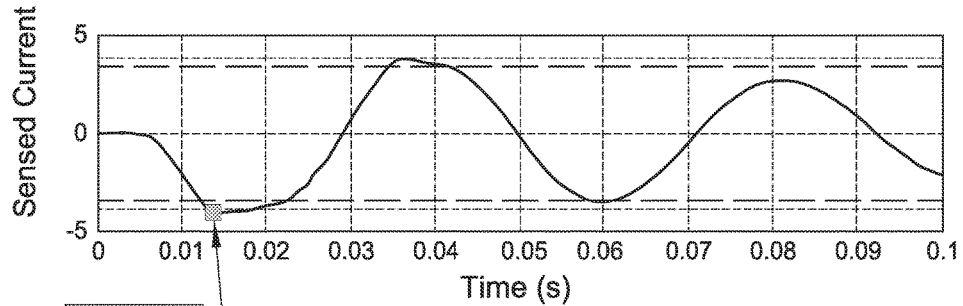

FIGS. 35*a*-35*c* contain plots corresponding to the same potential over-current condition with the dead zone current loop enabled as reflected by a measured current error and a modified normalized duty command resulting in a sensed current remaining within the current limit.

Figure 36:
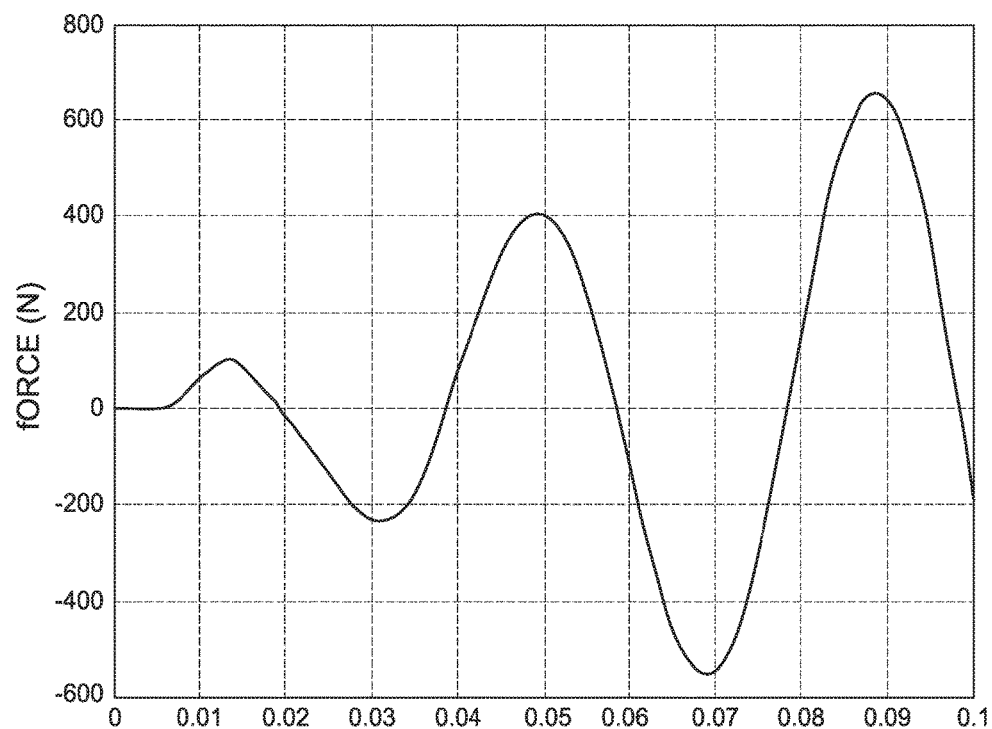

FIG. 36 contains a plot of the corresponding force output over the same time interval as the potential over-current condition.

Figure 37:
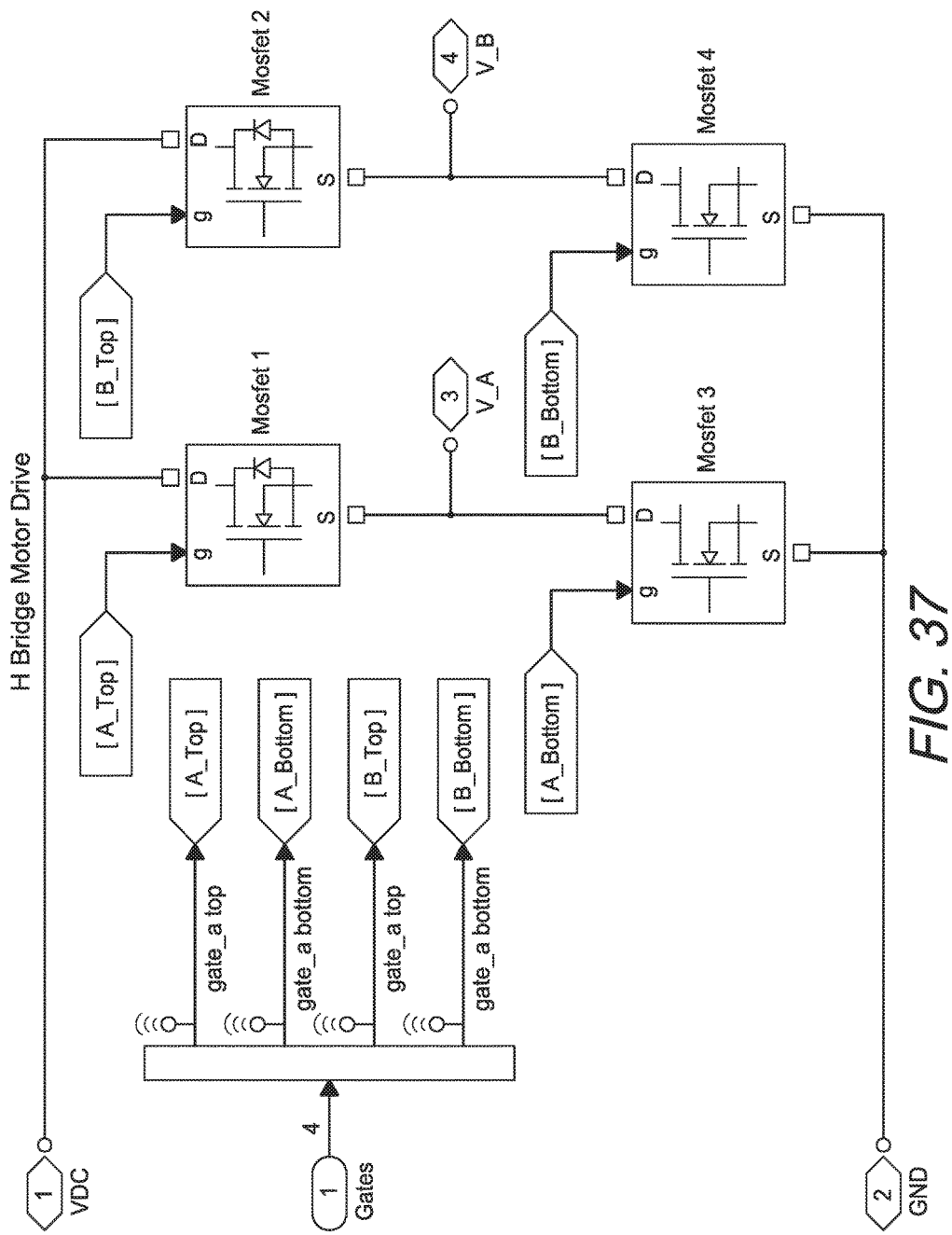

FIG. 37 is a schematic model of an H bridge motor driver for driving an inertial actuator.

Figures 38, 39:
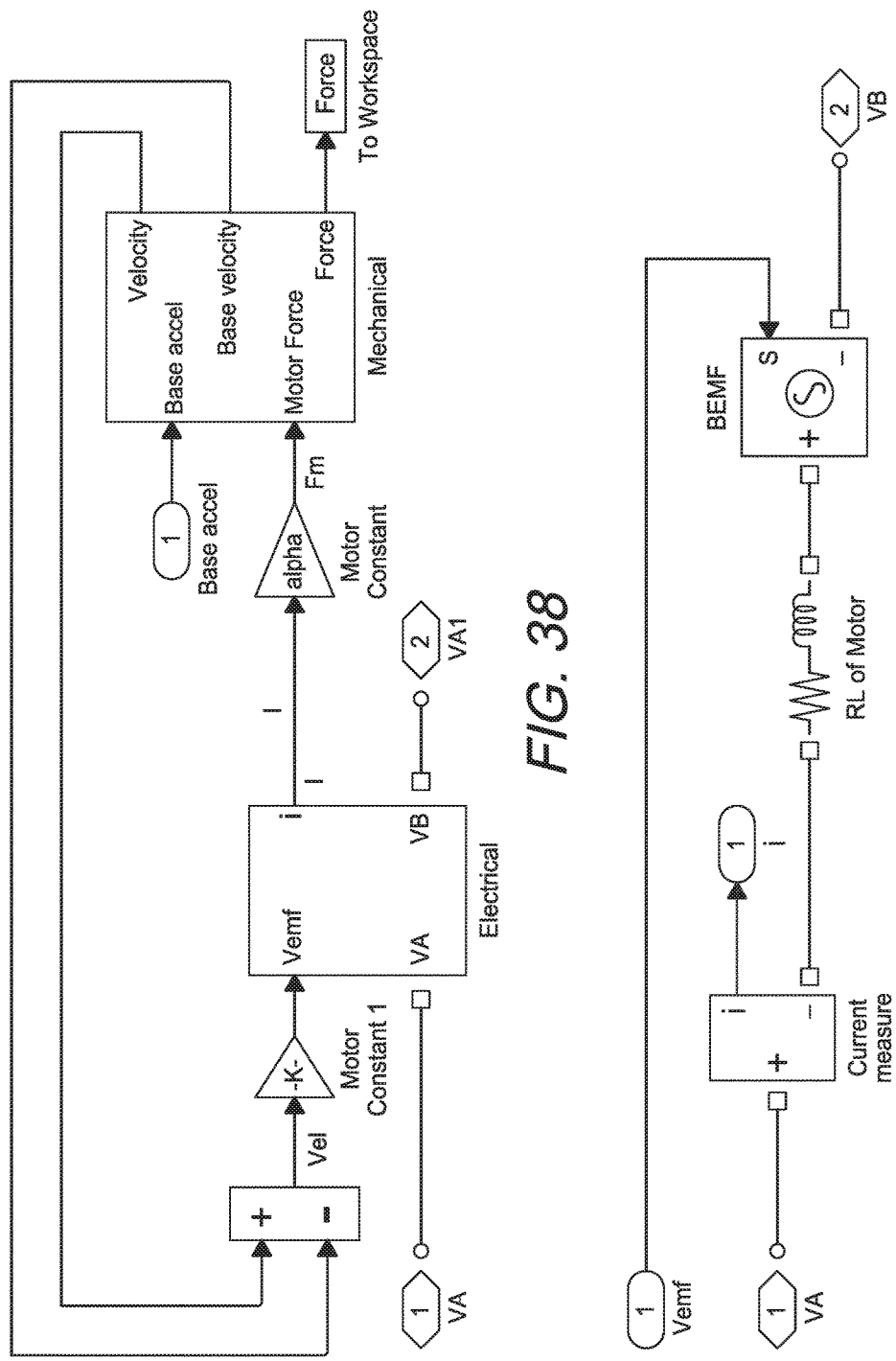

FIG. 38 is a schematic model of the inertial actuator.

FIG. 39 is a schematic model of an electrical control portion of the actuator.

Figure 40:
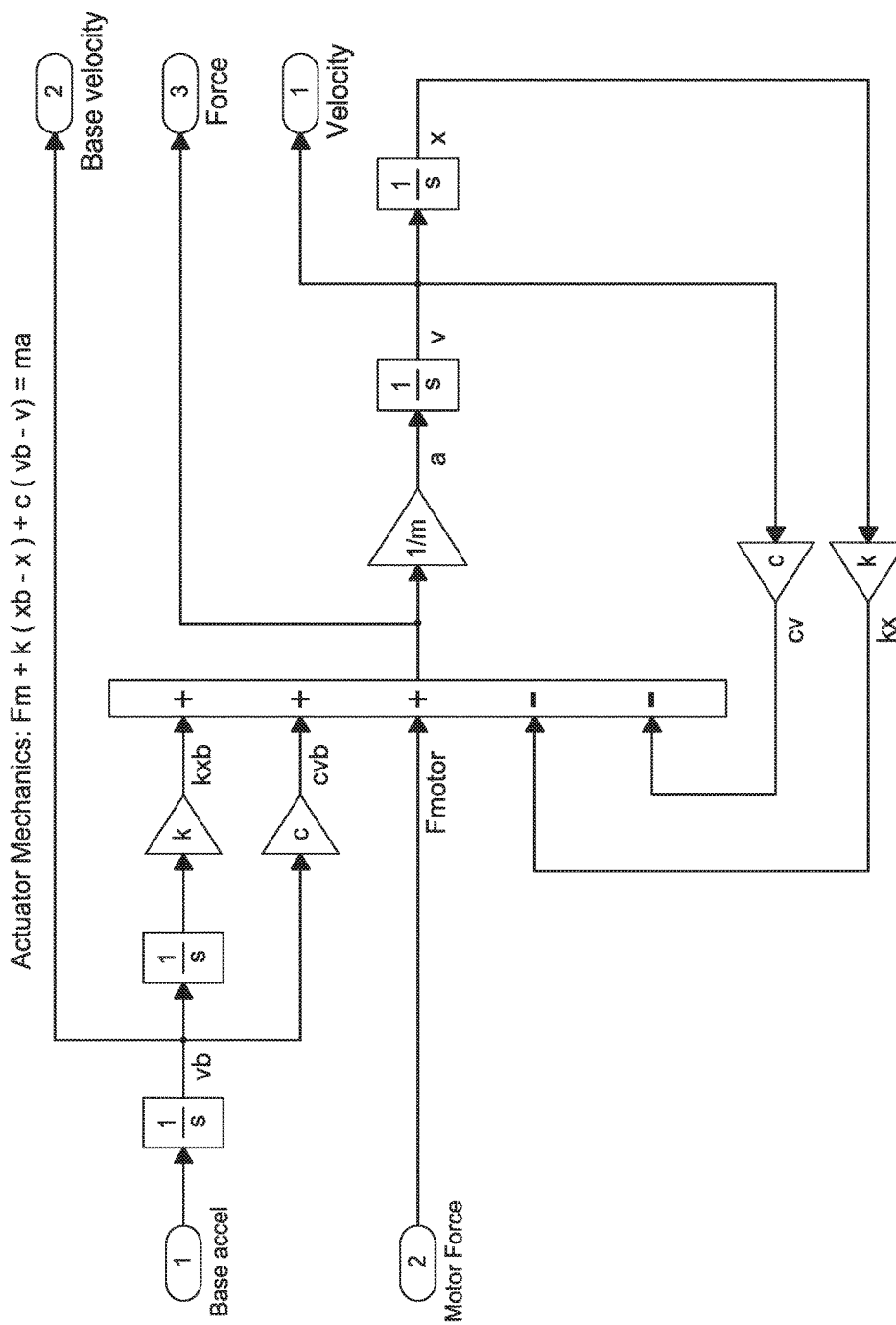

FIG. 40 is a schematic model of a mechanical control portion of the actuator.

DETAILED DESCRIPTION OF THE INVENTION

Additional features and advantages of the invention will be set forth in the detailed description which follows, and in part will be readily apparent to those skilled in the art from that description or recognized by practicing the invention as described herein, including the detailed description which follows, the claims, as well as the appended drawings. Reference will now be made in detail to the present preferred embodiments of the invention, examples of which are illustrated in the accompanying drawings. In preferred embodiments the invention provides improvements to the control of linear motors, particularly resonant inertial actuators such as disclosed in U.S. Pat. No. 7,686,246 of Badre-Alam et al. and International Patent Application Publication No. WO 2010/053933 of Badre-Alam et al.; both of which being hereby incorporated by reference.

Figure 1:
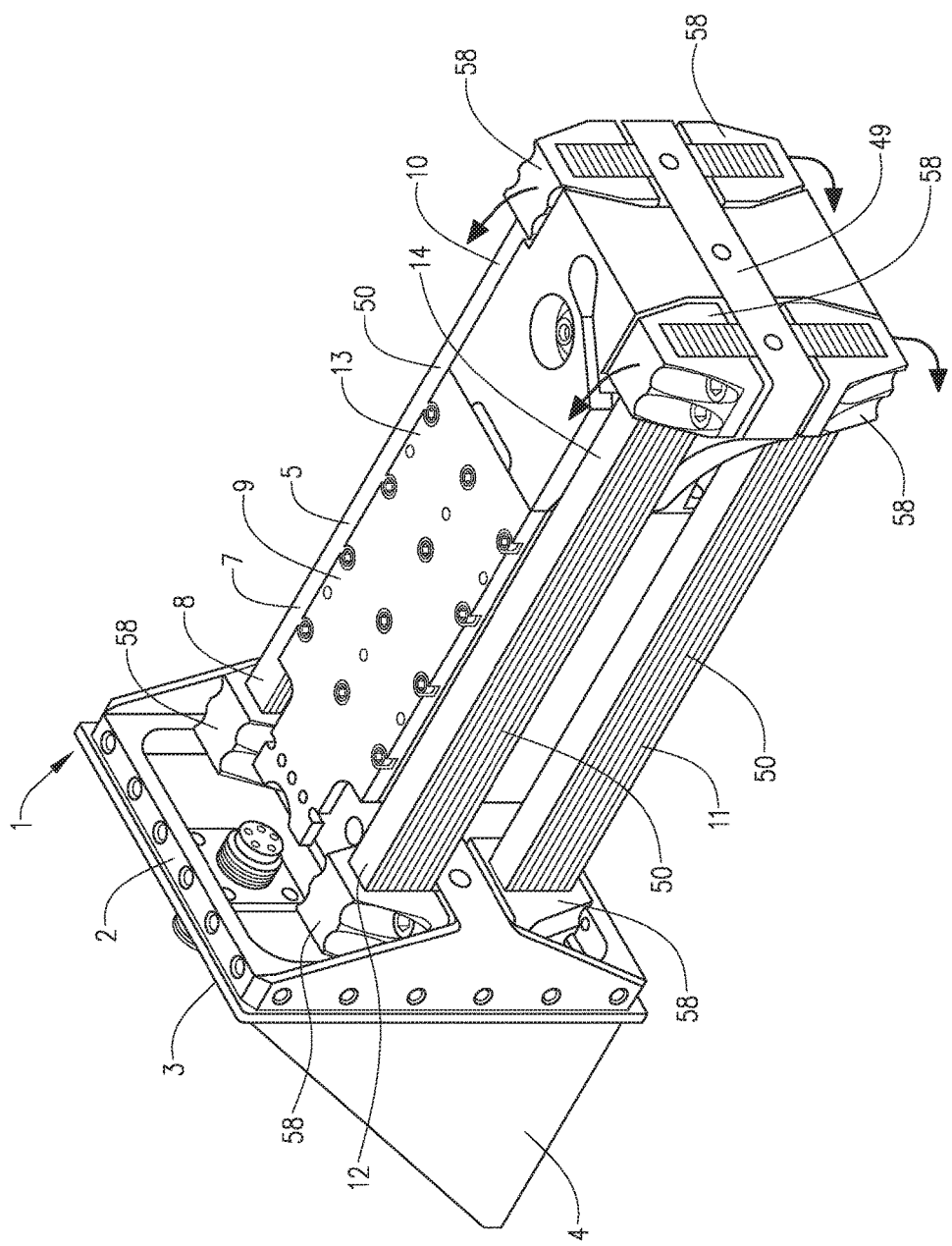
FIG. 1 is a perspective view of an electromagnetic inertial actuator.

FIG. 1 shows an electromagnetic resonant inertial actuator 1 whose control would benefit from the present invention. The electromagnetic resonant inertial actuator 1 includes a support base 3, which has an attachment plate 2 and mounting base 4. The attachment plate 2 can be integrally formed or otherwise attached to the mounting base 4. The bottom of the mounting base 4 can be attached to a machine structure, such as an aircraft structure, e.g., by bolts or other suitable attachment means. The electromagnetic resonant inertial actuator 1 also includes a parallel arrangement 5 of a first flexure part 7, a voice coil motor part 9, and a second flexure part 11. A "voice coil motor" is a positioning device that uses a coil of wire in a permanent magnetic field. In the parallel arrangement 5, the first flexure part 7 is spaced apart from the second flexure part 11, and the voice coil motor part 9 is disposed in the space between the flexure parts 7, 11.

The parallel arrangement 5 is cantilevered from the support base 3, with the flexure parts 7, 11 and the voice coil motor part 9 extending outward from the support base 3 in the manner of a cantilever. The ends 8, 12 of the flexure parts 7, 11, respectively, which are coupled to the support base 3, are the fixed or supported ends of the flexure parts 7, 11. The ends 10, 14 of the flexure parts 7, 11, respectively, which are unattached to the support base 3, are the moving or unsupported ends of the flexure parts 7, 11. The unsupported ends 10, 14 of the flexure parts 7, 11, respectively, are coupled to a magnet part 13 of the voice coil motor part 9.

Figure 2:
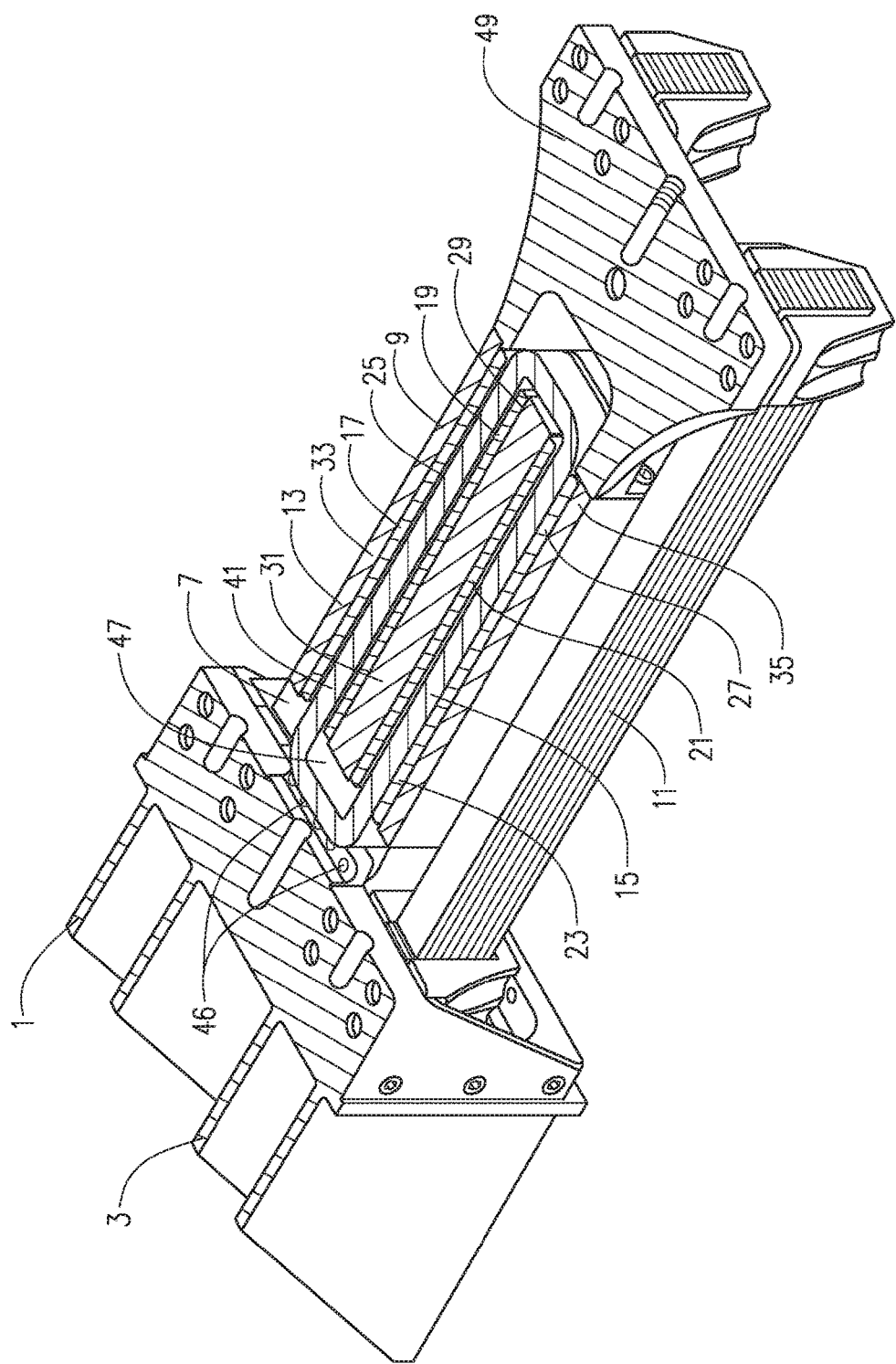
FIG. 2 is a perspective view of a bottom half of the electromagnetic inertial actuator shown in FIG. 1.
Figure 3:
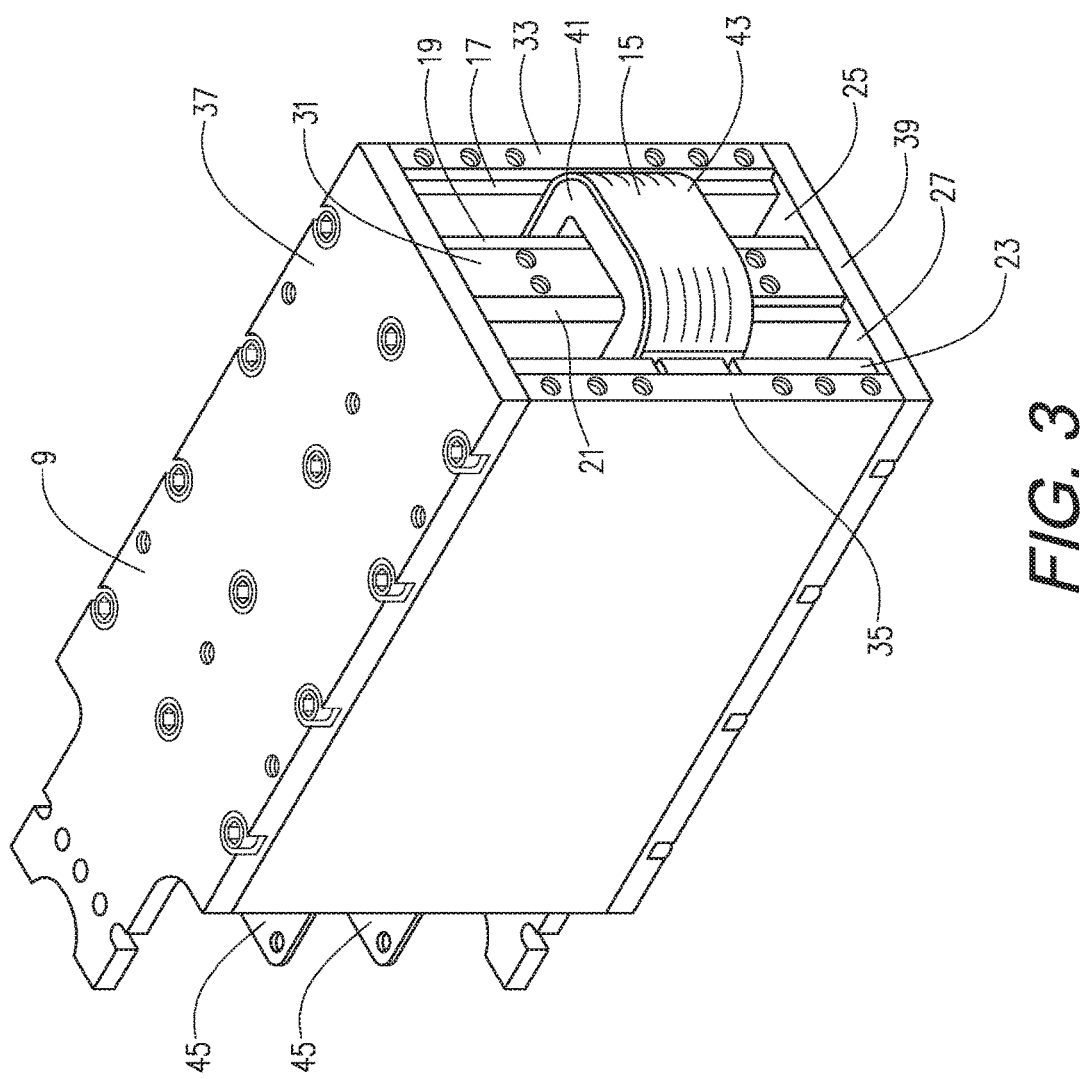
FIG. 3 is a perspective view of a flat voice coil motor.

In addition to the magnet part 13, the voice coil motor 9 also includes an interacting driving coil part (15 in FIGS. 2, 3). The interacting driving coil part (15 in FIGS. 2, 3) is preferably physically grounded to the support base 3, with the interacting driving coil part (15 in FIGS. 2, 3) being physically separated from the magnet part 13 and its associated cantilevered flexure-supported members, preferably with an air space gap.

In the spring-mass actuator system, the cantilevered flexure-supported magnet part 13 and its associated cantilevered flexure-supported moving mass members represent a sprung moving mass, and the flexure parts 7, 11 represent a spring. The magnet part 13 creates a magnetic field. When alternating current is supplied to the physically grounded non-sprung, non-moving coil part 15, the coil part 15 interacts with the magnetic field created by the sprung moving mass magnet part 13 to generate an electromagnetic driving force that vibrates the cantilevered flexure-supported sprung moving mass magnet part 13. The sprung moving mass magnet part 13 moves in an arc as it is electromagnetically driven (i.e., moves up and down along a vertical direction in relation to the support base 3 (and the grounded coil 15) and in and out relative to the support base 3 at the same time to trace an arc). If the frequency of the alternating current supplied to the coil part (15 in FIGS. 2, 3) is the same as the natural frequency of the spring-mass system, the excursions of the magnet part 13 can become quite large. The larger the excursions, the higher the output force of the electromagnetic resonant inertial actuator 1.

FIG. 2 shows a cut through the electromagnetic resonant inertial actuator 1, which allows a view of the interior of the voice coil motor part 9. In the embodiment shown in FIG. 2, the voice coil motor part 9 is a rectangular voice coil motor. The magnet part 13 includes permanent magnets 17, 19, 21, 23. The permanent magnets 17, 19, 21, 23 are flat (planar) and have a rectangular cross-section. In the embodiment of FIG. 2, the magnet part 13 has four permanent magnets. In alternate embodiments, the magnet part 13 could have more or fewer permanent magnets (as will be shown below with reference to FIGS. 11A-11N). In general, the four magnets provide a good balance between weight and magnetic gauss field. The permanent magnets 17, 19, 21, 23 are in a parallel arrangement with each other and are spaced apart.

Referring to FIG. 3, a gap 25 is defined between the adjacent permanent magnets 17, 19, and a gap 27 is defined between the adjacent permanent magnets 21, 23. A vertical plate 31 made of ferromagnetic material, such as low carbon steel, is disposed between the permanent magnets 19, 21. Vertical plates 33, 35 made of ferromagnetic material are also disposed adjacent to the permanent magnets 17, 23. In FIG. 3, horizontal plates 37, 39 made of ferromagnetic material are disposed adjacent to the tops and bottoms of the permanent magnets 17, 19, 21, 23. Also in FIG. 3, the ferromagnetic plates 31, 33, 35, 37, 39 are secured together, e.g., by means of bolts, to form an enclosure around the permanent magnets 17, 19, 21, 23 and thereby direct the magnetic flux path. In alternate embodiments, the ferromagnetic plates 31, 33, 35, 37, 39 could be integrated together, i.e., instead of being provided as separate pieces, into a unitary housing. As shown in FIG. 3, the permanent magnets 17, 19, 21, 23 are held firmly in place adjacent to the ferromagnetic plates 31, 33, 35, 37, 39 by friction. In alternate embodiments, the permanent magnets could be bonded to the ferromagnetic plates to thereby secure the permanent magnets in place.

Still referring to FIG. 3, the coil part 15 of the voice coil motor part 9 includes a coil 41 positioned in the gaps 25, 27. The coil 41, as shown in FIG. 3, is wound on a bobbin 43. The coil 41 is wound in an oval or rectangular shape, as is best seen in FIG. 2. The coil 41 may be made of copper wire or other suitable conducting wire material.

Figure 4:
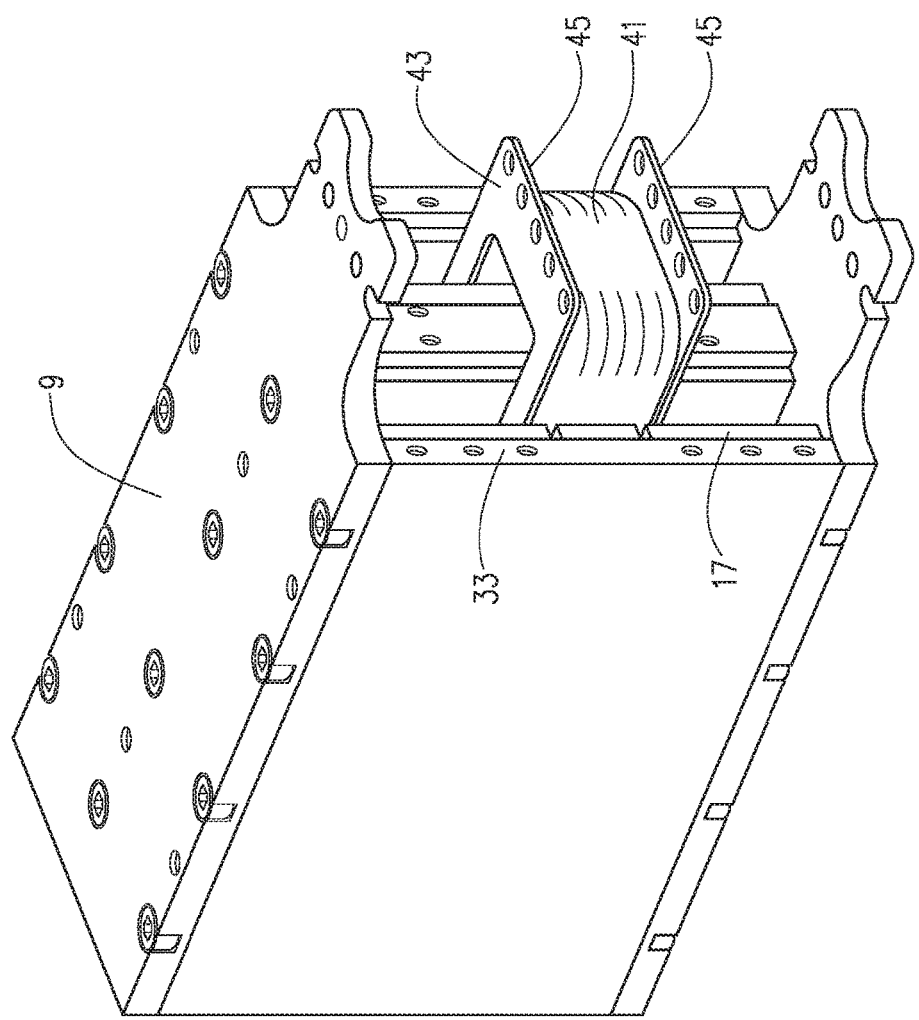
FIG. 4 is a rear view of the flat voice coil motor shown in FIG. 3.

In FIG. 4, the bobbin 43 has flanges 45 with holes formed in them. The flanges 45 are used to attach the bobbin 43 to the support (3 in FIGS. 1 and 2). In FIG. 2, the bolts 46 indicate where the bobbin 43 is attached to the support base 3. Other techniques for attaching the bobbin 43 to the support base 3 besides bolts and flanges may be used. In general, the bobbin 43 should be attached to the support base 3 such that it is cantilevered from the support base 3 and in parallel arrangement with the flexure parts 7, 11. In alternate embodiments, the bobbin 43 can be omitted and the coil 41 can be wound into the desired shape without the aid of a bobbin. In this case, the coil 41 will be free to move in the gaps 25, 27.

In FIG. 2, it should also be noted that there is an adjustable gap 47 between the distal ends of the coil 43 and magnet part 13. The gap 47 allows the magnet part 13 to move curvilinearly relative to the support base 3, preferably tracing an arc from the combination of a vertical movement and an axial in-and-out movement. Preferably, the electromagnetic resonant inertial actuator curvilinearly arcing moving mass is electromagnetically driven to move curvilinearly to trace out an arc.

Also, in FIG. 2, a yoke (i.e., a frame that couples together) 49 is coupled to the magnet part 13. For example, such coupling could include bolting the yoke 49 to the ferromagnetic plates 33, 35. Other means of coupling the yoke 49 to the magnet part 13 could be used provided the integrity of the coupling remains intact as the magnet part 13 moves.

Figure 5:
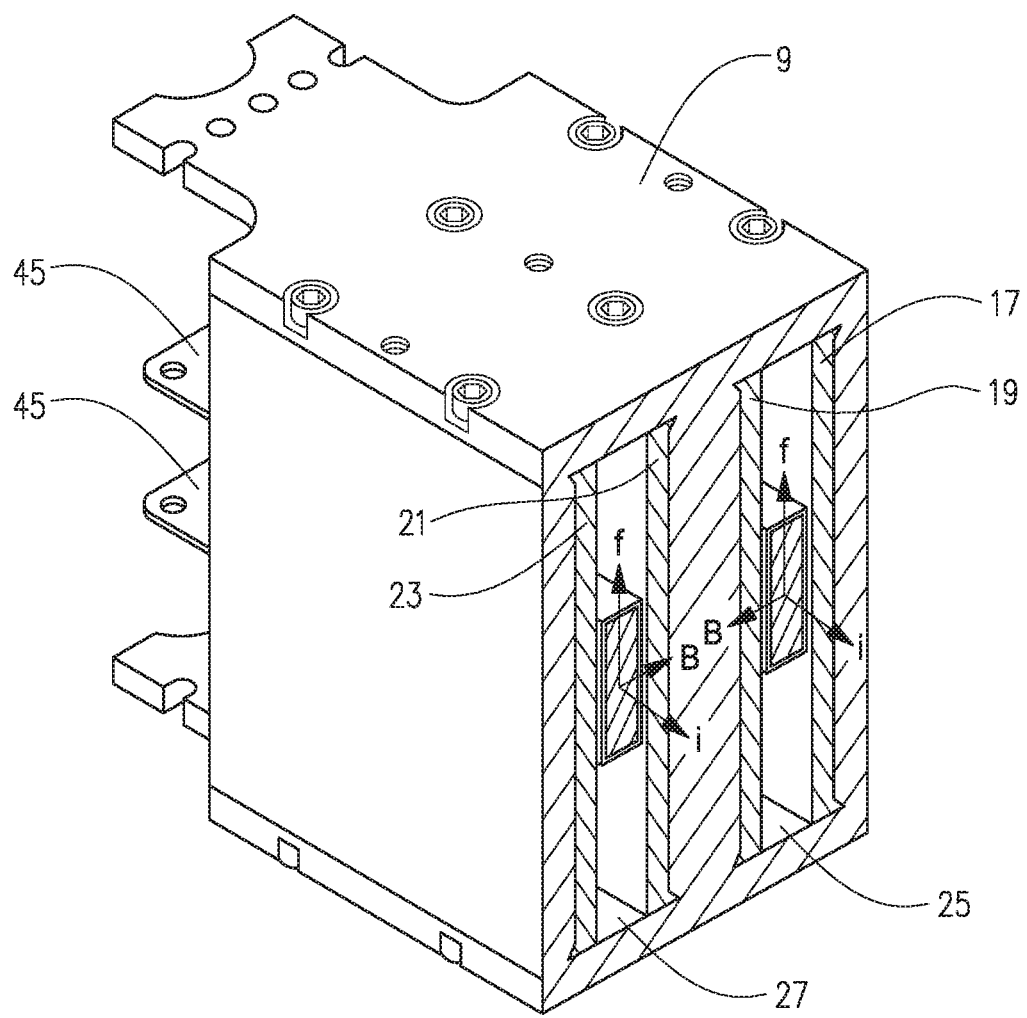
FIG. 5 is a perspective view of a left half of the flat voice coil motor shown in FIG. 3.

FIG. 5 shows a cut through the voice coil motor part 9. In FIG. 5, B indicates the magnetic field created by the magnets 17, 19, 21, 23 in the gaps 25, 27. When alternating current i is supplied to the coil 41, the windings in the coil 41 interact with the magnetic field B in the gaps to exert a force f that drives (moves) the magnet part 13.

Figure 6:
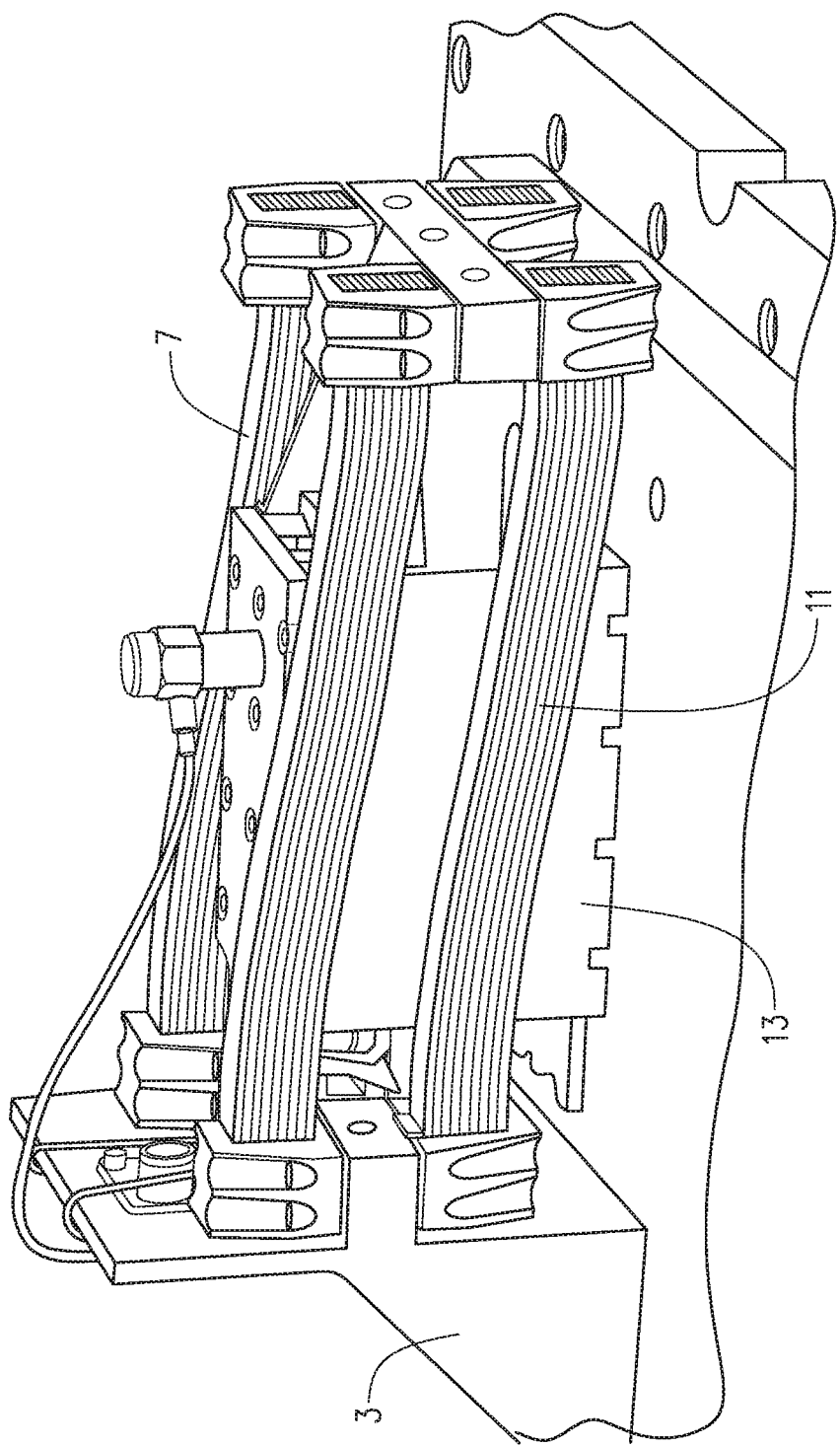
FIG. 6 shows the electromagnetic inertial actuator with the flat voice coil motor in a down position.
Figure 7:
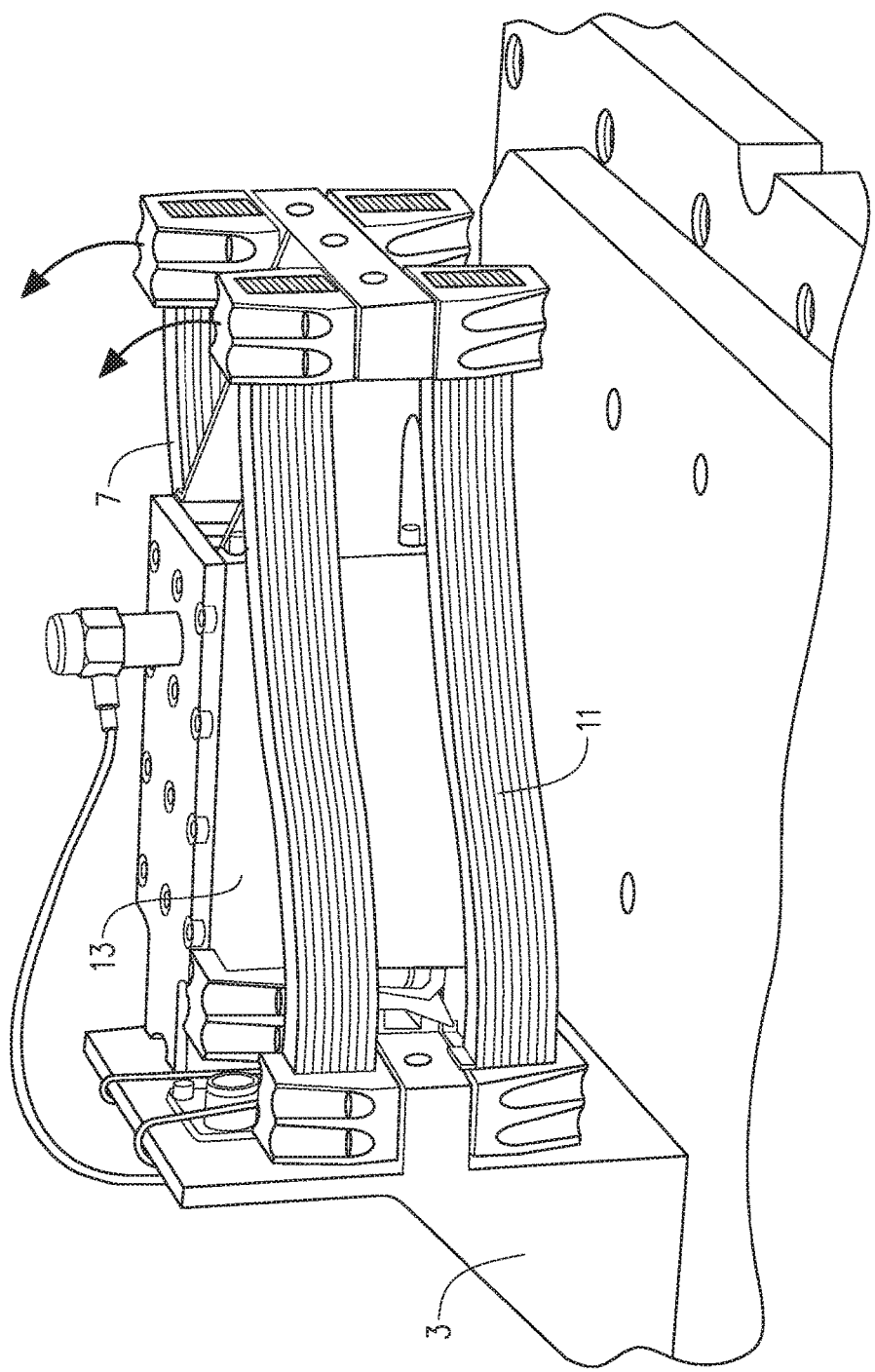
FIG. 7 shows the electromagnetic inertial actuator with the flat voice coil motor in an up position.
Figure 8:
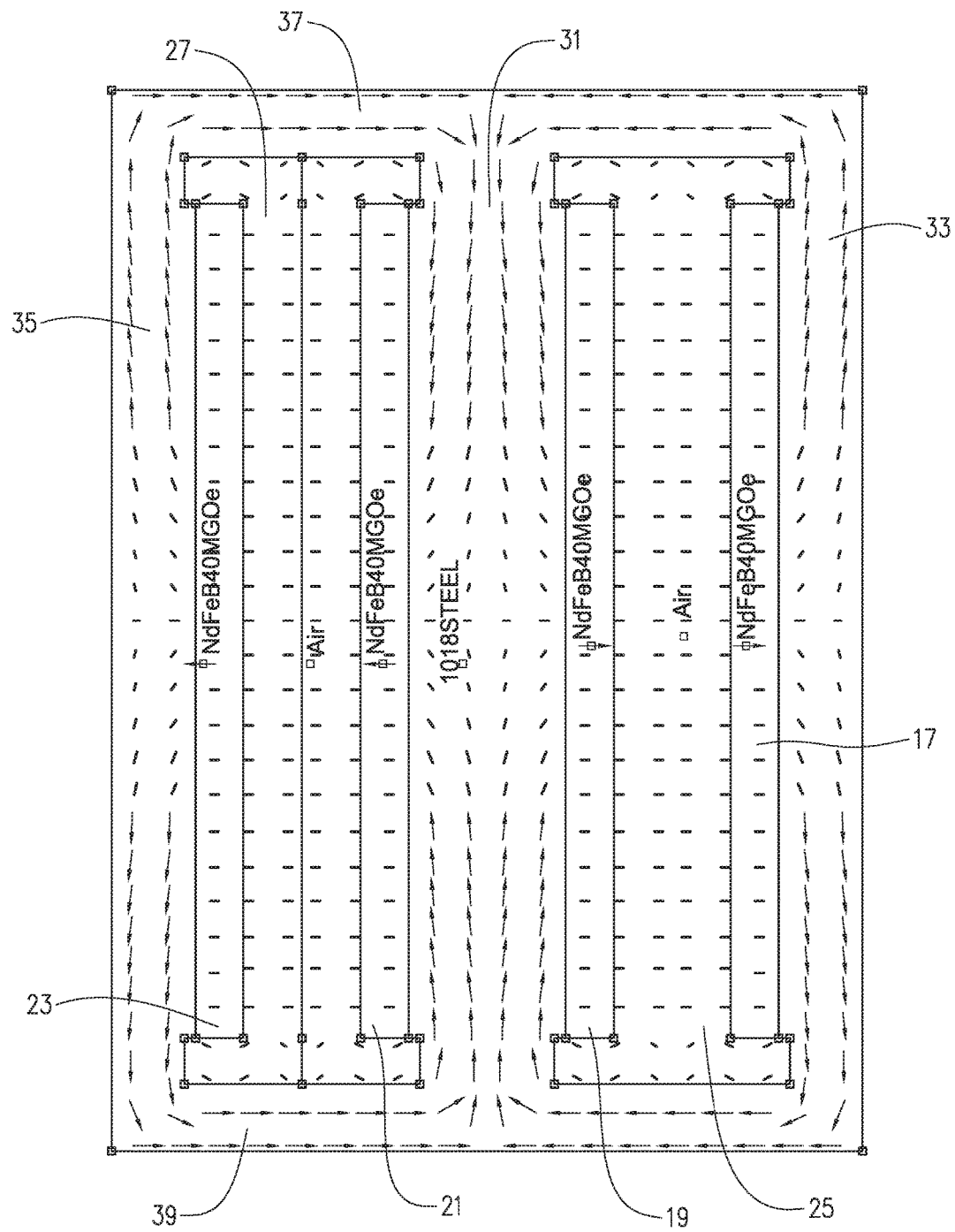
FIG. 8 shows magnetic flux in the flat voice coil motor.
Figure 9:
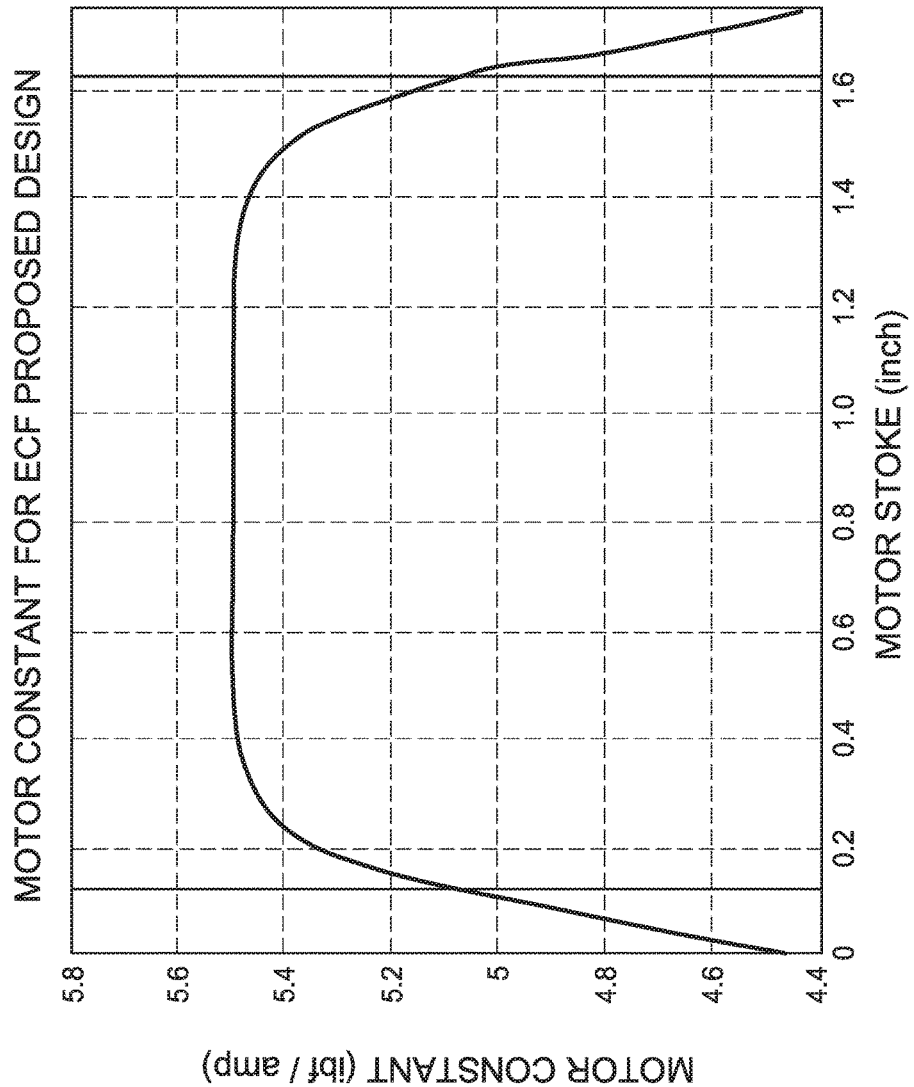
FIG. 9 is a plot showing force generated by the flat voice coil motor versus stroke of the motor.

Returning to FIG. 1, the flexure parts 7, 9 coupled to the magnet part 13 allow motion of the magnet part 13 along a vertical direction. Because of the cantilevered arrangement of the flexure parts 7, 9, the magnet part 13 moves in and out along an axial direction as it moves up and down along the vertical direction, thereby providing a curvilinear moving mass trace, preferably tracing an arc. FIG. 6 shows the magnet part 13 in a down position, with the flexure parts 7, 11 deflected downwardly. FIG. 7 shows the magnet part 13 in an up position, with the flexure parts 7, 11 deflected upwardly. The magnet part 13 moves in and out along the axial direction as it moves up and down along the vertical direction. As explained above, there is a gap (47 in FIG. 2) between the magnet part 13 and the coil (41 in FIG. 2) to accommodate axial motion of the magnet part 13 relative to the support base 3. FIG. 8 shows magnetic flux path in the ferromagnetic plates 31, 33, 35, 37, 39 when the windings in the coil 41 interact with the magnetic field created in the gaps 25, 27 by the permanent magnets 17, 19, 21, 23. FIG. 9 shows an example plot of force generated by the motor as a function of stroke of the motor. FIG. 9 shows that the force generated by the voice coil motor as described above is essentially linear, with very small force reduction at the ends of the stroke. In use, the force generated by the voice coil motor is transmitted to the support (3 in FIG. 1). If the support is attached to a structure, the force transmitted to the support can be used to counteract vibrations of the structure.

Figure 10:
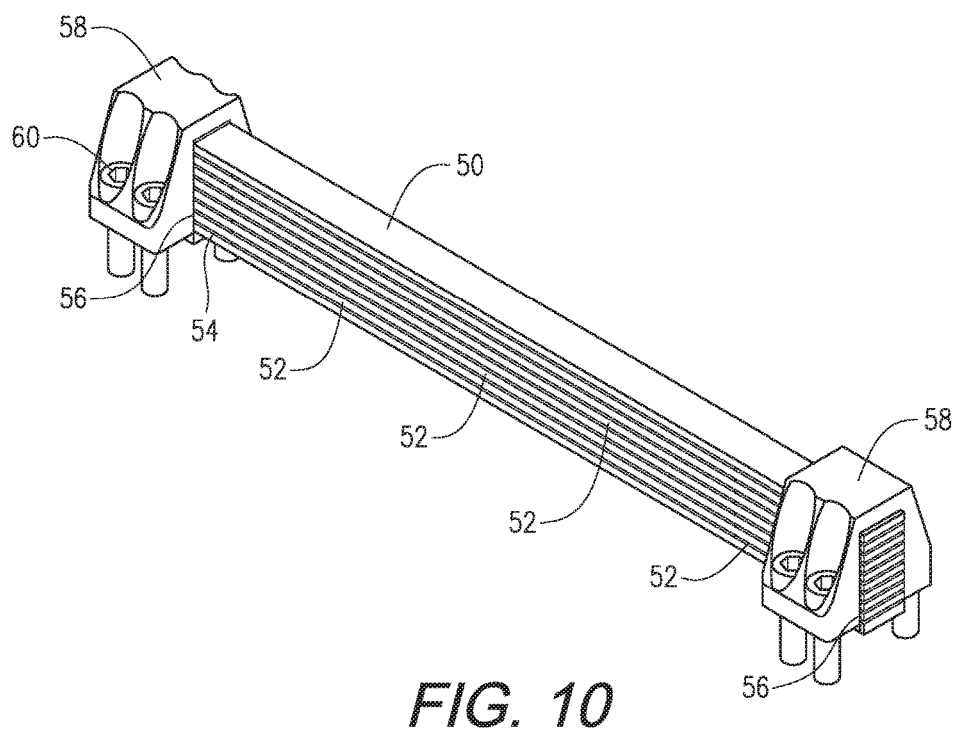
FIG. 10 is a perspective view of a flexure stack.

Returning to FIG. 1, the flexure parts 7, 11 are made up of two flexure stacks 50. In alternate embodiments, more or fewer flexure stacks may be included in each of the flexure parts 7, 11. FIG. 10 shows a flexure stack 50 according to one embodiment of the present invention. In the embodiment of FIG. 10, the flexure stack 50 includes flexures 52 interleaved with shims 54. In a preferred embodiment, the shims 54 are proximate the ends of the flexures 52 and do not extend along the flexure length with the middle of the stacks 50 free of the shims 54 (relatively short shims preferably bonded proximate ends of flexures and clamps 58 and do not extend the full length of the flexures through the mid-region of the flexure).

Each flexure 52 is in the form of a beam plate. The flexures 52 can be made of a non-elastomeric material, which may be metallic, non-metallic, or composite. Preferably, the flexures 52 are made of a composite or non-metallic material. In one embodiment, a composite material suitable for the flexures is comprised of reinforcing fibers in a polymer resin. In another embodiment, a composite material suitable for the flexures is comprised of a carbon-fiber reinforced composite. In another embodiment, the carbon-fiber reinforced composite is comprised of carbon fibers in a cured polymer matrix. In another embodiment, the carbon-reinforced fiber composite is comprised of carbon fibers in a cured epoxy matrix. The shims 54 could be made of metal or elastomer, with elastomer being preferred. In a preferred embodiment the elastomeric material for the shims is postvulcanized rubber. The shims 54 in a preferred embodiment are bonded to the flexures 54 proximate their ends and the clamps 58, with the shims inhibiting a fretting of the flexures as they move with the stroke of the voice coil motor. Preferably the bonded elastomeric shims 54 are provided to inhibit a fretting of the flexures 54.

The distal ends of the flexure stack 50 are inserted into apertures 56 in flexure clamps 58 and held in the apertures 56, e.g., by friction. The flexure clamps 58 have a double row bolt arrangement 60 (i.e., two rows of bolts, with the rows positioned on opposite sides of the clamps), and with this arrangement, the flexure stack 50 can be firmly attached to the bracket (49 in FIG. 1) and the vertical support (3 in FIG. 1). The double row bolt arrangement (60 in FIG. 10) improves the clamp stiffness and reduces the moment loads on the bolts (of the double row bolt arrangement) when the clamp 58 is secured to the bracket or vertical support.

Returning to FIG. 1, the flexure stacks 50 span the full length of the resonant inertial actuator 1, thereby allowing large strokes of the voice coil motor part 9. Large strokes result in large output forces of the resonant inertial actuator 1. The flexure stacks 50 are very stiff in five directions (lateral, longitudinal, and three rotations) but flexible in the vertical direction, allowing curvilinear movement of the magnet part 13 of the voice coil motor part 9. The cantilevered arrangement of the flexure parts 7, 11 and voice coil motor part 9 retains the parallel orientation of the voice coil motor part 9 relative to the flexure parts 7, 11 throughout the stroke of the voice coil motor part 9.

Figure 11A:
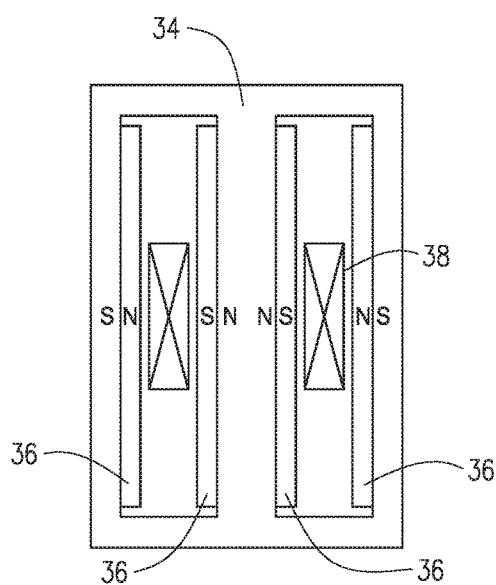
FIGS. 11A-11N show voice coil/magnet arrangements for a voice coil motor of an electromagnetic inertial actuator.
Figure 11B:
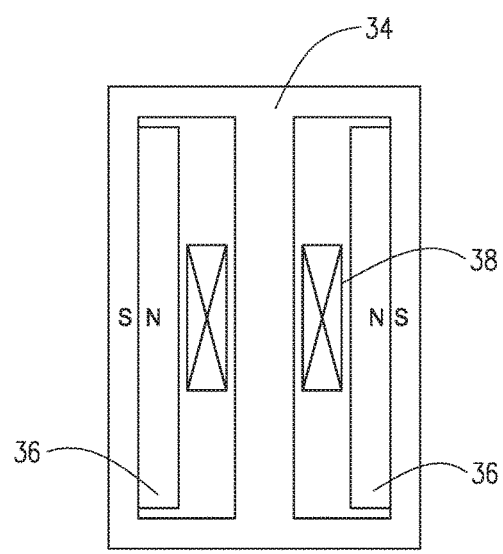
Figure 11C:
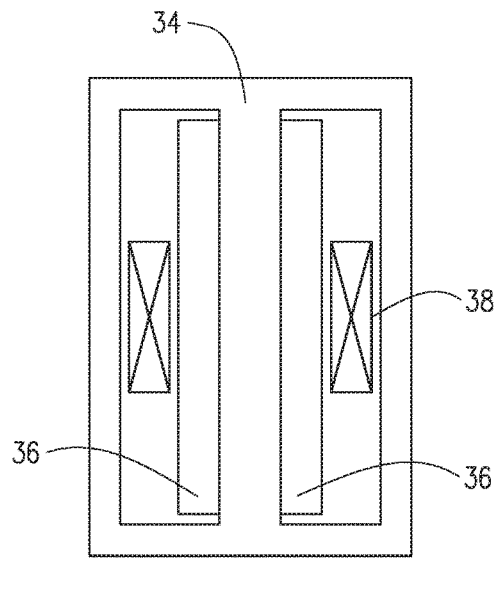
Figure 11D:
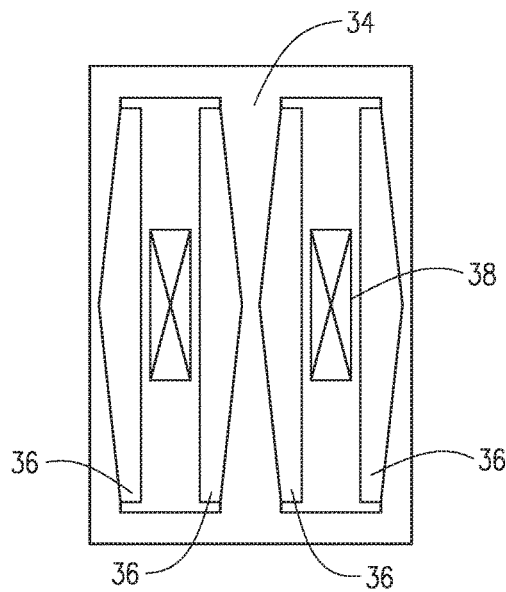
Figure 11E:
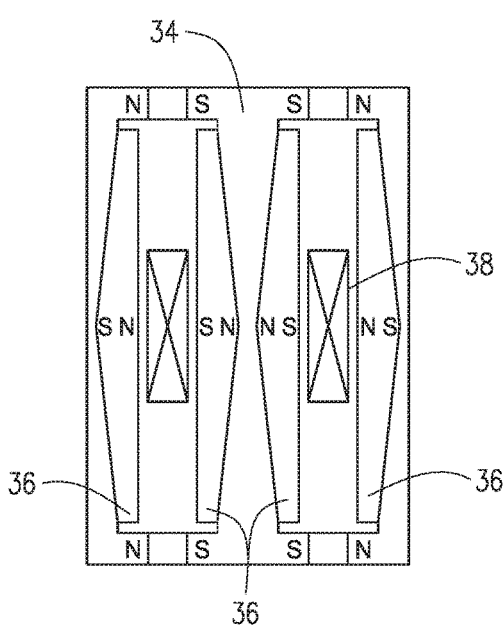
Figure 11F:
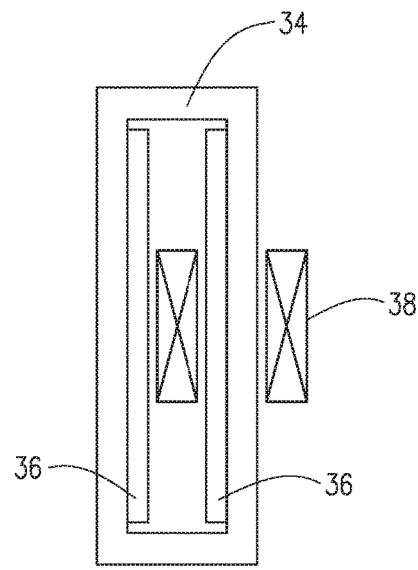
Figure 11G:
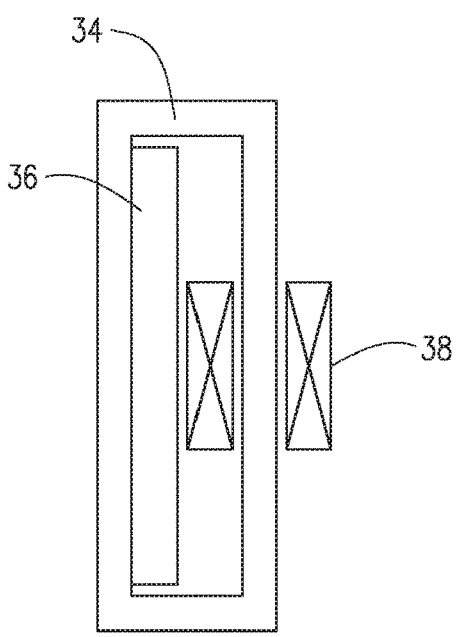
Figure 11H:
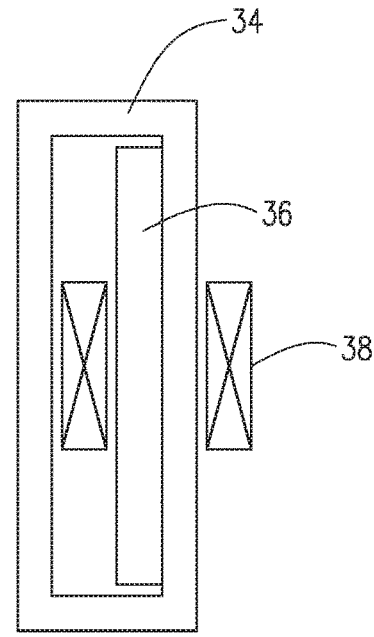
Figure 11I:
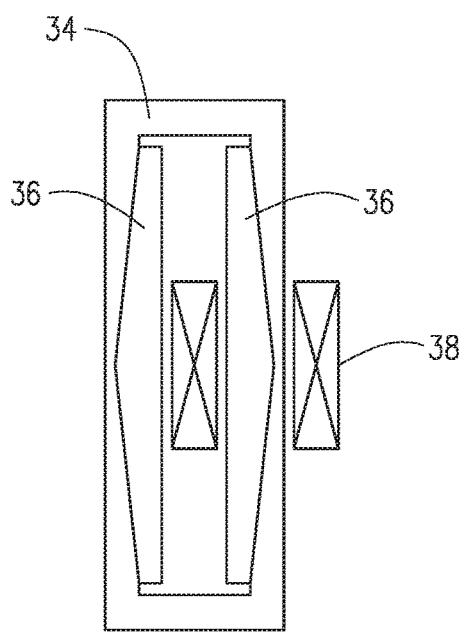
Figure 11J:
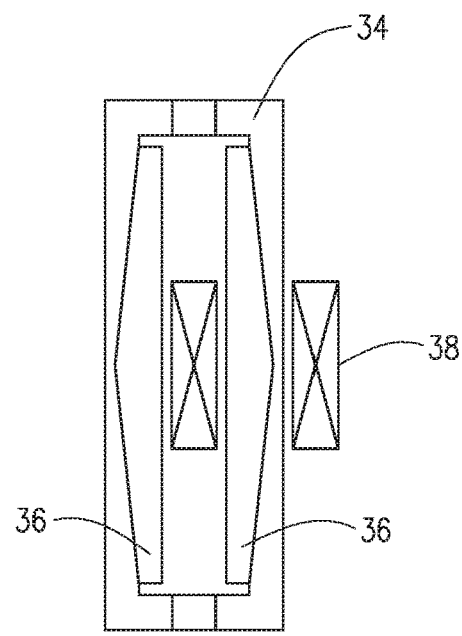

FIGS. 11A-11N show various examples of voice coil/magnet arrangements usable in the voice coil motor part (9 in FIG. 1) of the electromagnetic resonant inertial actuator (1 in FIG. 1). These arrangements include a ferromagnetic housing 34, or a plurality of ferromagnetic plates 34, defining a gap or a plurality of parallel gaps. These arrangements further include one or more permanent magnets 36 disposed in gap(s) and one or more coils 38 disposed adjacent to the permanent magnet(s) 36. The coils 38 are typically annular or rectangular in shape as described above. Multiple coils 38 may be used in a stacked arrangement, such as shown in FIGS. 11K-11N. The arrangement shown in FIG. 11A is similar to the one described above with reference to FIGS. 5 and 8.

Figure 12:
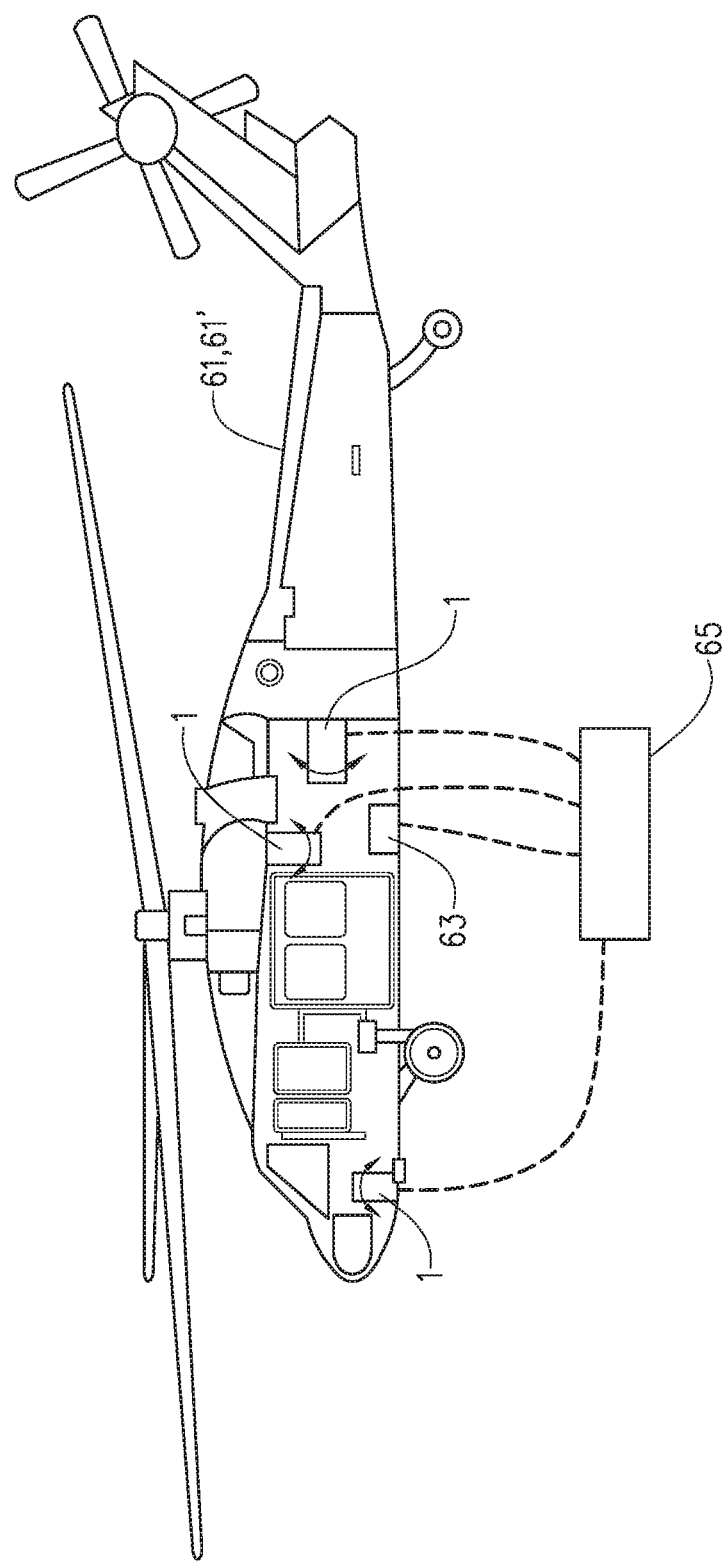
FIG. 12 shows an aircraft including a vibration control system.

FIG. 12 shows an aircraft machine 61 having a rotary wing system with at least one rotating blade rotating about a rotation axis. In use, the rotary wing system generates troublesome structural vibrations. A vibration control system for the aircraft 61 includes one or more vibration sensors 63 (e.g., accelerometers) mounted on the aircraft to sense the troublesome structural vibrations. The vibration control system also includes one or more electromagnetic resonant inertial actuators 1 cantilever-mounted on the aircraft 61. The vibration control system also includes a controller 65. The controller 65 is shown outside of the aircraft machine for illustration purposes only. In practice, the controller 65 would be on-board the aircraft. The controller 65 receives signals from the vibration sensor(s) 63 representative of the troublesome structural vibrations. The controller 65 then sends signals to the electromagnetic resonant inertial actuators 1, instructing the electromagnetic resonant inertial actuator(s) 1 to generate a force that counteracts the troublesome structural vibrations. Preferably the controller drives a plurality of electromagnetic resonant inertial actuators with the actuators' sprung moving mass magnet part 13 tracing curvilinear arcs relative to their support bases, the support bases being physically grounded to the aircraft machine structure. Preferably the resonant inertial actuators' sprung moving mass magnet part 13 is cantilevered and sprung supported with the composite flexures with the bonded elastomer end fret inhibiting shims.

In an embodiment the invention includes the aircraft machine 61, the machine includes resonant inertial actuator controller 65 and resonant inertial actuator 1, the resonant inertial actuator has a resonant frequency, the resonant inertial actuator controller electromagnetically drives the resonant inertial actuator at a near resonant frequency, with the near resonant frequency proximate the resonant frequency, the resonant inertial actuator controller intermittently drives the resonant inertial actuator at an off-resonance frequency for separate intervals of time, with the off-resonance frequency distal from the resonant frequency, with the resonant inertial actuator controller monitoring a current and a voltage through the resonant inertial actuator over at least portions of the separate intervals of time, and with the controller calculating an operating parameter value of the resonant inertial actuator based on the monitored current and the monitored voltage within the separate time intervals wherein the controller reduces the demanded force of the resonant inertial actuator in response to the calculated operating parameter value crossing a threshold value. Preferably the resonant inertial actuator 1 is a cantilevered resonant inertial actuator, preferably with a sprung moving mass magnet part moving in an arc. Preferably the cantilevered resonant inertial actuator has adjacent composite flexures 52 with bonded elastomer end fret inhibiting shims 54 between the adjacent composite flexures, preferably with the composite flexures providing for the sprung moving mass magnet part moving in the arc. Preferably the resonant inertial actuator operating parameter is at least one resonant inertial actuator operating parameter selected from the resonant inertial actuator operating parameter group including an actuator temperature, an actuator displacement, an actuator force, and an actuator power. Preferably the controller electromagnetically drives the resonant inertial actuator at the near resonant frequency with a demanded force power, and the controller drives the resonant inertial actuator at the off-resonance frequency with a non-resonant frequency power less than the demanded force power.

Figure 13:
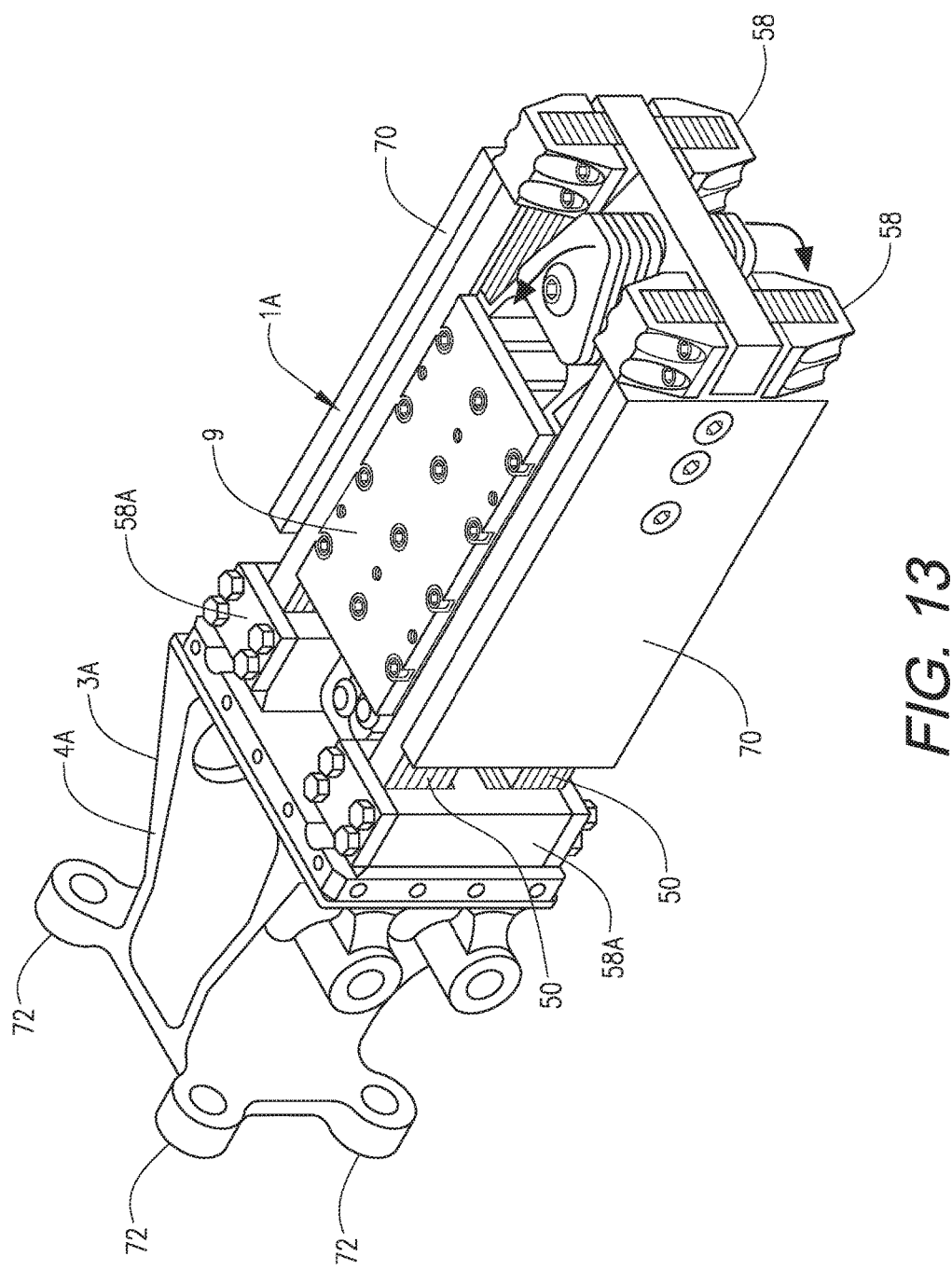
FIG. 13 is a perspective view of a variant of the electromagnetic inertial actuator shown in FIG. 1.

FIG. 13 shows a variant 1A of the electromagnetic resonant inertial actuator 1 of FIG. 1. In FIG. 13, weights 70, e.g., made of a metal such as steel, are coupled to the voice coil motor part 9. The weights 70 add mass to the sprung moving mass. Mounting base 4A of the support base 3A shown in FIG. 13 is different from the mounting base 4 shown in FIG. 1. The base 4A of FIG. 13 has ears or flanges 72 that allow mounting of the base 4A to a structure through a side of the base 4A. (In comparison, the base 4 of FIG. 1 can be mounted to a structure through a bottom of the base.) In FIG. 13, the flexure clamps 58A at the support base 3A are different from the flexure clamps 58 at the support base 3 shown in FIG. 1. Each of the flexure clamps 58A shown in FIG. 13 can receive ends of multiple flexure stacks. The flexure clamps 58 shown in FIG. 1 can only receive one end of a single flexure stack.

Figure 14:
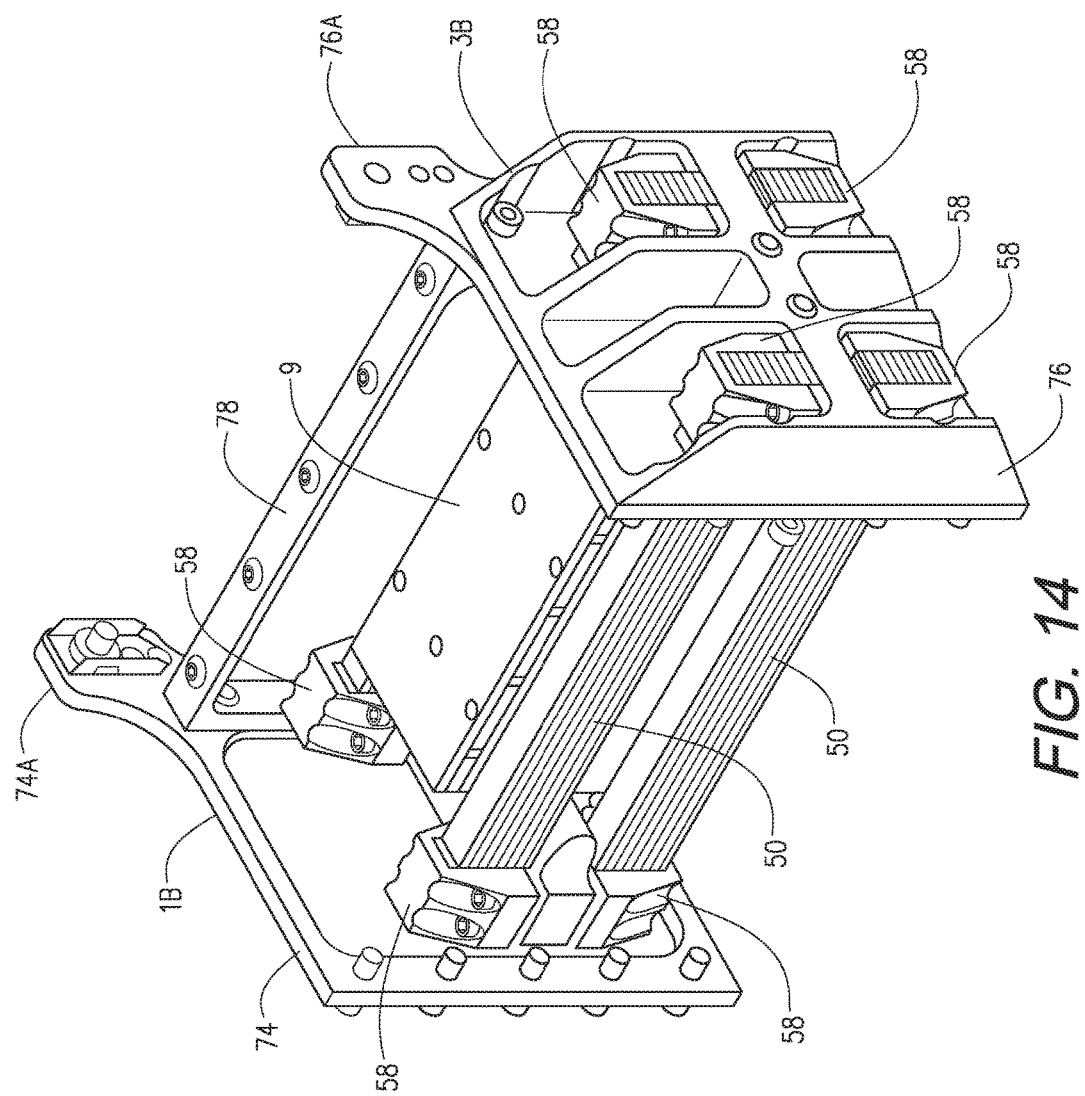
FIG. 14 is a perspective view of a variant of the electromagnetic inertial actuator shown in FIG. 1.

FIG. 14 shows a variant 1B of the electromagnetic resonant inertial actuator 1 of FIG. 1. The variant 1B differs from the embodiment shown in FIG. 1 primarily in terms of the support base. In FIG. 14, the support base 3B includes parallel plates 74, 76. The flexure stacks 50 at one end are coupled to the parallel plate 76, via attachment of the flexure clamps 58 to the parallel plate 76. The flexure stacks 50 at the other end are free to move and are not coupled to the parallel plate 74. The parallel plates 74, 76 are attached to a frame 78, thereby ensuring the rigidity of the support base 3B. The parallel plates 74, 76 include ears or flanges 74A, 76A that can be connected to a structure. The support base 3B allows the electromagnetic resonant inertial actuator 1B to be mounted sideways to a structure. The cantilevered parallel arrangement of the flexure stacks 50 and voice coil motor 9 is maintained by fixing the arrangement to only one of the parallel plates, i.e., parallel plate 76.

Preferred embodiments of the invention are directed to control systems and the control of resonant inertial actuators such as by voltage control systems with current limiting. Preferred embodiments of the invention include control systems with improved flatness of both a magnitude and a phase response, improving a base input rejection, and using a dead zone current loop to limit current exceeding a given threshold. Preferably the control systems provide for monitoring and dynamic limiting of operating parameters of resonant inertial actuators such as resonant inertial actuator operating parameters selected from the resonant inertial actuator operating parameter group including voltage, current, power, stroke, force, and temperature.

Preferably such improvements are implemented via Digital Signal Processing (DSP), Field Programmable Gate Array (FPGA) motor control, and filtering. The improvements to Digital Signal Processing (DSP) preferably include (a) shape filtering to provide frequency dependent gain, (b) online estimates of resistance and temperature, (c) calculations of displacement and force, (d) quadrature amplitude demodulation to monitor voltage, current, power, displacement, and force, along with calculated root mean squared (rms) power, and (e) dynamic limiting of voltage, current, power, displacement, force, and temperature.

In contrast to control systems in earlier examples of resonant inertial actuators, embodiments of the invention are preferably based on voltage rather that current control. Although voltage control is not subject to significant changes in the force response near the natural resonance frequency of the resonant inertial actuators, some further flattening of the force response over an intended operating range of oscillation frequencies is still possible as illustrated by the magnitude and phase plots vs. frequency of FIGS. 15a and 15b. For example, the actuator force response through the operating range of oscillation frequencies can be further flattened by providing the responsive amplifier for driving the resonant inertial actuator with a gain vs. frequency profile modified according to the following relationship:

$$Ref\ Shaping\ Gain = \left(\frac{\omega_{nom}}{\omega}\right)^4 \qquad 21$$

where $\omega_{nom}$ is the nominal frequency and $\omega$ is the drive frequency.

FIG. 16 plots the ref gain function over the operating frequency range, and FIGS. 17a and 17b respectively plot the magnitude and phase response of the resonant inertial actuator over the operating range, contrasting the voltage control response with and without the application of the ref gain function for reshaping the gain profile.

Real time up to date online estimates of resistance can be taken by operating the resonant inertial actuator off resonance and processing values of the feedback current i and voltage v through the resonant inertial actuator. Indications of the stroke, force, and temperature of the resonant inertial actuator can be derived from estimates of resistance within the drive circuit (largely a coil) of the resonant inertial actuator. The resistance within the drive circuit of the resonant inertial actuator is expected to be affected by temperature increases accompanying the heating of the electromagnetic coil and, thus, is best estimated online. The resistance can be derived from the real part of the impedance.

An estimate of the resistance can be carried out by driving the resonant inertial actuator through a negligible stroke at non-resonant frequency so that the back (counter) electromotive force (bemf) portion of the impedance is negligible. For example, as shown in FIGS. 18a and 18b, the resonant inertial actuator can be oscillated (buzzed) with a 5 Volt signal, at 5 Hz, for 5 seconds. The drive signal is preferably slew-rated to avoid producing any abrupt forces on the structure (such buzz preferably uses less than 2 watts of power.)

FIG. 19 presents a schematic diagram through which resistance can be estimated. Feedback values for current i and voltage v are filtered by a 4th order IIR Butterworth band pass filter between 2.5 and 10 Hz. The filtered time domain signals of current i and voltage v are transformed into complex (i.e., frequency) domain signals of complex current I and complex voltage V using quadrature amplitude demodulation with a second order 2 Hz low pass filter. After waiting for one second of the five second oscillation (buzz) of the resonant inertial actuator, a four second block average of the complex current I and complex voltage V is acquired. The average complex voltage V is divided by the average complex current I and the real part of the impedance is estimated as the resistance R as shown below:

$$R = \text{Re}\left(\frac{V}{I}\right) \qquad 22$$

The quadrature amplitude demodulation and block averaging of the complex current I and complex voltage V is explained by the schematic diagram of FIG. 20.

The temperature T of the coil (i.e., the main portion of the drive circuit) can be estimated from changes in coil resistance. A relationship between resistance and temperature is presented below:

$$T = T_{ref} + \frac{1}{\lambda}\left(\frac{R}{R_{ref}} - 1\right) \qquad 23$$

where $T_{ref}$ is the ambient (room) temperature, $R_{ref}$ is the resistance measured at the ambient temperature $T_{ref}$, R is a more recent (e.g., the latest) resistance estimate, and $\lambda$ is a temperature coefficient of resistance, such as $\lambda=0.00393$ for copper wire in the coil.

Preferably, the resistance "R" is periodically estimated (e.g., every 30 seconds) for monitoring changes in the estimated temperature T. A temperature limiting scheme is implemented for protecting the actuator coil, in which the demanded force is limited until the temperature is reduced below the limit. Any reduction in the force output of the actuator is preferably carried out at a slow enough rate for the temperature T to respond to the reduction in force and power.

Estimating the resistance R also allows for open and short circuit detection. If the resistance estimate R is outside of a normal resistance range for an extended period of time, then an actuator fault protection can be triggered by turning the affected channel off.

For calculating displacement and force, an electrical description of the motor can be derived from Kirchhoff's voltage law as follows:

$$\sum V = 0 \qquad 24$$

$$V - V_{bemf} - Ri - L\frac{di}{dt} = 0 \qquad 25$$

where, R is the resistance, L is the inductance, $V_{bemf}$ is the back electromotive force of the motor.

Equation 25 can be related to the velocity of the resonant actuator through the constitutive law for back emf as follows:

$$V_{bemf} = K_t \dot{x} \qquad 26$$

Substituting Equation 26 into 25, and expressing the equation in the Laplace domain, the following equation results:

$$V - sXKt - IR - sIL = 0 \qquad 27$$

where "s" is a numerical derivative symbol.

Referring to FIG. 21, solving for displacement X, the above equation can be rewritten as follows:

$$X = \frac{1}{s\alpha}(V - (R + sL)I) \qquad 28$$

where "1/s" is a numerical integration function, "α" is a measurable motor constant, and "L" is inductance.

Based on the calculated displacement X and using Newton's second law, a relationship for actuator force $F_a$ can be calculated as follows:

$$\Sigma F = s^2 mX = F_a \qquad 29$$

Assuming a simple harmonic motion of the resonant inertial actuator, Equation 29 can be rewritten as follows:

$$F_a = s^2 mX = (j\omega)^2 mX = -m\omega^2 X \qquad 210$$

Equations 28 and 210 can be used to estimate actuator displacement X and force $F_a$. These equations are advantageous because non-linear parameters such as stiffness and mechanical damping fall out of the equations. The remaining parameters tend to be relatively constant except for resistance R, which can be estimated online as described above. A schematic diagram presented in FIG. 21 depicts the implementation of Equations 28 and 210 by Digital Signal Processing (DSP). As can be seen in the diagram of FIG. 21, additional bandpass, lowpass, and highpass filtering is added to sufficiently clean up the signals.

To obtain magnitudes of voltage $V_{mag}$, current $I_{mag}$, root mean squared power $P_{rms}$, displacement $X_{mag}$, and force $F_{mag}$, quadrature amplitude demodulation can be used as shown in the schematic diagram of FIG. 22. For example, the rms power $P_{rms}$ can be calculated in accordance with the following equation:

$$P_{rms} = R\left(\frac{|I|}{\sqrt{2}}\right)^2 = \frac{1}{2}\text{Re}\left(\frac{V}{I}\right)|I|^2 = \frac{1}{2}\text{Re}(VI^*) \qquad 211$$

Once having acquired their online values, limits can be set or otherwise controlled for the operating parameters of Voltage V, Current I, Power $P_{rms}$, Displacement X, Force $F_a$, and Temperature T. The plots of FIGS. 23a-23c depict an example of changing a power limit at 2.5 seconds with the power limit changing from 70 watts to 50 watts. As can be seen, about one-half second is required for an implementation algorithm to saturate a so-designated "A weight" properly with the corresponding the force reduction. An algorithm for limiting the measured and estimated parameters is presented at the end of the Detailed Description.

A preferred implementation of a Field Programmable Gate Array (FPGA) motor control is schematically depicted in FIG. 24. The overall architecture of the motor control can be divided into parts, which include (1) an interpolation filter, (2) voltage rail normalization, (3) a current dead zone loop, (4) a pulse width modulation (PWM) generator, and (5) decimation filtering.

An implementation of the interpolation filter, as shown in FIG. 25, provides for up-sampling from 1 kHz to 96 kHz. This is accomplished by sampling the digital signal processing (DSP) command signal at 96 kHz and stuffing zeros in-between samples. The resulting signal is low-pass filtered with a sixth order, three-section IIR Butterworth filter with a cutoff frequency of 200 Hz. An additional gain of 96 is used to compensate for the zero stuffing.

FIGS. 26a-26c include plots of the up sampled data with FIG. 26a plotting the DSP input voltage command, FIG. 26b plotting the zero stuffed data, and FIG. 26c plotting the interpolated voltage command signal as output from the interpolation filter. The evident smoothing feature of the interpolation filter also reduces sudden changes in voltage for limiting associated spikes in current. FIGS. 27a-27c include plots illustrating the smoothing effect of the interpolation filter following an impulse in the voltage command signal. FIG. 27a plots the voltage command signal with an impulse after approximately 20 ms. FIG. 27b plots the voltage command signal output from the interpolation filter, and FIG. 27c plots the sensed current derived from the command signal having a significantly reduced current spike.

A duty cycle command is generally directly proportional to the voltage command signal if the voltage rail from a power supply unit is constant. However, under some loading conditions the voltage rail can have about a ripple voltage at the N/rev drive frequency. If unaccounted for, this ripple would distort the desired drive voltage. To avoid this distortion, the duty cycle command can be normalized by the measured high voltage rail.

A voltage rail compensation circuit as shown in FIG. 28 includes an IIR Low Pass Butterworth filter with the sample rate of 96 kHz and a cutoff frequency at 1 kHz for filtering voltage values of the voltage rail. A nominal voltage is then divided by the filtered voltage rail. This can be accomplished directly or with a lookup table. As shown in FIG. 29, a voltage rail normalization factor is then directly multiplied with the voltage command (or duty cycle command) to normalize the command signal.

FIGS. 30a-30c depict an example of the voltage rail normalization beginning in FIG. 30a with a plot of the voltage of the voltage rail showing an approximately +/−5 volt ripple over a 0.1 seconds interval. FIG. 30b plots the calculated normalization factor over the same interval, and FIG. 30c plots the sensed voltage V showing little or no influence from the voltage modulation of the voltage rail.

The voltage rail normalization in general provides an ability to reject base input disturbances. FIGS. 31a and 31b exemplify this ability. As shown in these figures, the effect on the force output with a 0.75 g base input disturbance is minimized. Despite the base input disturbance, the force output is little changed.

A dead zone current loop as depicted in FIG. 32 is only active if the measured current exceeds the limit. A proportional-integral controller (a PI controller) adjusts the duty cycle command to minimize an error between the sensed current and the current limit. Within the depicted current loop, the sensed current is filtered by a 2nd order IIR Butterworth low-pass filter with a cutoff at 500 Hz. This filter can have a variable sample rate due to the variation of the current sensor pulse width modulation (PWM) output, but the nominal sample time is preferably 130 kHz.

The filtered signal goes through a dead zone function, which generates zero output within a specified region, referred to as its "dead zone." If the input filtered signal is within the dead zone (greater than the lower limit and less than the upper limit), the output is zero. If the input filtered signal is greater than or equal to the upper limit, the output is the input minus the upper limit. If the input filtered signal is less than or equal to the lower limit, the output is the input minus the lower limit.

The output of the dead zone function can be considered the error that enters the PI compensator. The PI loop, which is depicted in FIG. 33, is only enabled when the current exceeds the given threshold. Otherwise the error is zeroed, and the integrator is zeroed. To prevent numerical overflow or damage to the drives, the duty cycle is saturated to +/−95%.

FIGS. 34a-34c depict an undesirable over-current condition with the dead zone current loop disabled (i.e., no current error is detected in the plot of FIG. 34a and no affect is apparent in the plot of the normalized duty command in FIG. 34b). The over-current condition, which is considered as any current beyond a threshold of about +/−5.5 amps, is exceeded at 0.018 seconds within a 0 to 0.1 seconds time interval plotted in FIG. 34c.

FIGS. 35a-35c depict the same 0 to 0.1 seconds time interval with the dead zone current loop enabled at 4.5 amps. Here the current error accumulates as shown in FIG. 35a and reduces the duty cycle command as shown in FIG. 35b to try to keep the current below 4.5 amps. As shown in FIG. 35c, some current overshoot occurs, but the dead zone loop keeps the current from exceeding the over-current limit. If desired, the dead zone limit could be reduced to 4 amps to further protect against an over-current event. The corresponding force output over the same 0 to 0.1 seconds time interval is plotted in FIG. 36.

Although not shown within the FPGA architecture (see FIG. 34), additional overload protection can be provided by generating an over-current bit from the feedback current sensor (e.g., setting a trip at +/−5.5 amps) turning off the drive with the FPGA motor control, sending the over-current bit to the DSP, and maintaining the drive in an off condition until the DSP turns the drive back on.

Pulse width modulation can be performed with a high side field effect transistor (FET) that switches while a desired low side field effect transistor (FET) is closed.

Decimation filters preferably filter the sensed voltage and current signals, as well as the voltage rail. To prevent aliasing, 4th order decimation filters can be used. These filters are 2 second order section, IIR Butterworth filters with a cutoff frequency of 250 Hz and a sample rate of 96 kHz.

A schematic layout of a motor driver in accordance with the invention suitable for a resonant inertial actuator is shown in FIG. 37 as an H Bridge motor driver. An electrical layout for the resonant inertial actuator is presented in FIG. 38 with electrical and mechanical portions shown in further detail within FIGS. 39 and 40.

In an embodiment the invention includes machine 61'. Machine 61' includes resonant inertial actuator controller 65 and resonant inertial actuator 1. Resonant inertial actuator 1 has a resonant frequency. Resonant inertial actuator controller 65 electromagnetically drives resonant inertial actuator 1 at a near resonant frequency, with the near resonant frequency proximate the resonant frequency. Resonant inertial actuator controller 65 intermittently drives resonant inertial actuator 1 at an off-resonance frequency for separate intervals of time. The off-resonance frequency is distal from the resonant frequency, with resonant inertial actuator controller 65 monitoring a current and a voltage through resonant inertial actuator 1 over at least portions of the separate intervals of time. Resonant inertial actuator controller 65 calculates an operating parameter value of resonant inertial actuator 1 based on the monitored current and the monitored voltage within the separate time intervals, wherein the controller reduces the demanded force of resonant inertial actuator 1 in response to the calculated operating parameter value crossing a threshold value. Preferably resonant inertial actuator 1 is a cantilevered resonant inertial actuator, preferably with a sprung moving mass magnet part moving in an arc. Preferably the cantilevered resonant inertial actuator has adjacent composite flexures 52 with bonded elastomer end fret inhibiting shims 54 between the adjacent composite flexures. Preferably with the composite flexures providing for the sprung moving mass magnet part moving in the arc. Preferably resonant inertial actuator 1 operating parameter is at least one resonant inertial actuator operating parameter selected from the resonant inertial actuator operating parameter group including an actuator temperature, an actuator displacement, an actuator force, and an actuator power. Preferably resonant inertial actuator controller 65 electromagnetically drives resonant inertial actuator 1 at the near resonant frequency with a demanded force power, and the controller drives the resonant inertial actuator at the off-resonance frequency with a non-resonant frequency power less than the demanded force power.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

What is claimed is:

1. A method of dynamically limiting an operating parameter of a resonant inertial actuator operating with a vibrating structure, the method comprising:
   driving the resonant inertial actuator at a near resonant frequency of the resonant inertial actuator for counteracting vibrations in the structure;
   intermittently driving the resonant inertial actuator at an off-resonance frequency for separate intervals of time;
   monitoring a current and a voltage through the resonant inertial actuator over at least portions of the separate intervals of time;
   calculating values of the operating parameter of the resonant inertial actuator based on the monitored current and voltage within the separate intervals of time; and reducing a demanded force of the resonant inertial actuator in response to calculated values of the operating parameter crossing a threshold value.

2. The method of claim 1, comprising estimating resistance values through the resonant inertial actuator as a real part of impedance from the monitored current and voltage within the separate intervals of time.

3. The method of claim 2, wherein calculating values of the operating parameter incorporates the estimated resistance values.

4. The method of claim 1: wherein:
the operating parameter is an actuator displacement operating parameter; and
reducing the demanded force includes reducing the demanded force in response to calculated values of the actuator displacement operating parameter crossing the threshold value.

5. The method of claim 4, wherein the operating parameter comprises first and second operating parameters, the actuator displacement operating parameter being the first operating parameter and the second operating parameter being an actuator force operating parameter, the method comprising:
calculating values of the actuator force operating parameter based on the values of the actuator displacement operating parameter; and
reducing the demanded force of the resonant inertial actuator in response to calculated values of the actuator force operating parameter crossing an actuator force threshold value.

6. The method of claim 1, wherein the operating parameter is a temperature of the resonant inertial actuator, the temperature of the resonant inertial actuator being limited by a reduction in the demanded force.

7. The method of claim 1, comprising:
transforming the monitored current and voltage in a time domain into a complex current value and a complex voltage value in a frequency domain; and
averaging the complex current and voltage values over at least a portion of the time domain.

8. The method of claim 7, comprising dividing an averaged complex voltage value by an averaged complex current value.

9. The method of claim 7, wherein transforming the monitored current and voltage comprises performing quadrature amplitude demodulation.

10. The method of claim 1, wherein the operating parameter is an actuator power operating parameter and reducing the demanded force comprises reducing the demanded force in response to calculated values of the actuator power operating parameter crossing the threshold value.

11. The method of claim 7, wherein the complex current and voltage values are incorporated into calculating the values of the operating parameter of the resonant inertial actuator, the method comprising:
comparing the calculated value of the operating parameter against the threshold value, wherein the threshold value relates to a desired range of operation for the resonant inertial actuator; and
limiting a command output of the resonant inertial actuator to maintain the value of the operating parameter within the desired range.

* * * * *